(12) United States Patent
Lim et al.

(10) Patent No.: US 10,929,009 B2
(45) Date of Patent: Feb. 23, 2021

(54) ELECTRONIC DEVICE FOR OUTPUTTING GRAPHIC INDICATION

(71) Applicant: Samsung Electronics Co., Ltd, Suwon-si (KR)

(72) Inventors: Young Seok Lim, Suwon-si (KR); Hong Seok Kwon, Suwon-si (KR); Ho Min Moon, Gumi-si (KR); Mi Jung Park, Hwaseong-si (KR); Woo Young Park, Gumi-si (KR); Ki Hyoung Son, Yongin-si (KR); Won Ick Ahn, Yongin-si (KR); Pil Seung Yang, Suwon-si (KR); Jae Seok Yoon, Pyeongtaek-si (KR); Gi Soo Lee, Gumi-si (KR); Sun Jung Lee, Seoul (KR); Jae Hyeok Lee, Seoul (KR); Hyun Yeul Lee, Seoul (KR); Hyeon Cheon Jo, Busan (KR); Doo Soon Choi, Yongin-si (KR); Kyung Wha Hong, Yongin-si (KR); Da Som Lee, Seoul (KR); Yong Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 15/966,990

(22) Filed: Apr. 30, 2018

(65) Prior Publication Data
US 2018/0314417 A1    Nov. 1, 2018

(30) Foreign Application Priority Data

Apr. 28, 2017   (KR) .................. 10-2017-0055712

(51) Int. Cl.
*G06F 17/00*     (2019.01)
*G06F 3/0488*    (2013.01)
(Continued)

(52) U.S. Cl.
CPC .......... *G06F 3/04883* (2013.01); *G06F 3/016* (2013.01); *G06F 3/0482* (2013.01); *G06F 3/0488* (2013.01); *G06F 3/167* (2013.01)

(58) Field of Classification Search
CPC .. G06F 3/04842; G06F 3/017; G06F 3/04883; G06F 3/0488; G06F 3/016;
(Continued)

(56) References Cited

U.S. PATENT DOCUMENTS 8,543,397 B1 * 9/2013 Nguyen .............. G06F 3/04883
704/235
9,794,394 B2   10/2017 Lee et al.
(Continued)

FOREIGN PATENT DOCUMENTS

KR   10-2016-0026480 A   3/2016
KR   10-2018-0003884 A   1/2018

*Primary Examiner* — Andrew T McIntosh

(57) ABSTRACT

An electronic device is provided. The electronic device includes a housing, a touch screen display that includes a first edge and a second edge, a microphone, at least one speaker, a wireless communication circuit, a memory, and a processor operably connected with the touch screen display, the microphone, the at least one speaker, the wireless communication circuit, and the memory. The processor is configured to output a home screen including a plurality of application icons in a matrix pattern. The processor is configured receive an input from the first edge to the second edge. The processor is configured output a user interface on the touch screen display that includes a button that allows user to call a first operation and a plurality of cards. To call the first operation the processor is configured to receive a user input, transmit data and receive a response, and perform a task.

20 Claims, 12 Drawing Sheets

(51) Int. Cl.
*G06F 3/01* (2006.01)
*G06F 3/0482* (2013.01)
*G06F 3/16* (2006.01)

(58) Field of Classification Search
CPC ...... G06F 3/0482; G06F 3/167; G06F 1/1626; G06F 1/1671; G06F 3/0483; G06F 3/0485
See application file for complete search history.

(56) References Cited

U.S. PATENT DOCUMENTS

| | | | |
|---|---|---|---|
| 2013/0007665 A1* | 1/2013 | Chaudhri | G06F 3/04817 715/830 |
| 2015/0169071 A1* | 6/2015 | Jitkoff | G06F 3/04883 715/863 |
| 2015/0178397 A1* | 6/2015 | Garg | H04L 67/10 707/722 |
| 2016/0062609 A1 | 3/2016 | Kim et al. | |
| 2016/0140960 A1 | 5/2016 | Chae | |
| 2016/0357390 A1* | 12/2016 | Federighi | G06F 3/04883 |
| 2017/0099592 A1* | 4/2017 | Loeb | H04L 67/303 |
| 2018/0004371 A1 | 1/2018 | Han et al. | |

* cited by examiner

ELECTRONIC DEVICE FOR OUTPUTTING GRAPHIC INDICATION

CROSS-REFERENCE TO RELATED APPLICATION AND CLAIM OF PRIORITY

This application is based on and claims priority under 35 U.S.C. § 119 to Korean Patent Application No. 10-2017-0055712 filed on Apr. 28, 2017, in the Korean Intellectual Property Office, the disclosure of which is incorporated by reference herein its entirety.

TECHNICAL FIELD

The present disclosure relates to technologies for outputting graphic indications on a display.

BACKGROUND

With the development of mobile communication technology, electronic devices, such as smartphones and wearable devices, each of which has a display, have come into wide use. Such an electronic device may output whether content (e.g., an application, a card, or the like) is updated on its display. For example, when a user changes a page, the electronic device may output whether content is updated on the changed page. For another example, when the user drags a status bar down, a quick panel may be output. The electronic device may output information associated with updated content on the quick panel.

SUMMARY

As described above, there is a need for an additional operation such that the user verifies whether content is updated. In other words, the user is unable to immediately verify whether content is updated in a state where a specific page (e.g., a home screen) is output on a display. Thus, the user does not receive updated content at proper timing, thus feeling uncomfortable.

Aspects of the present disclosure are to address at least the above-mentioned problems and/or disadvantages and to provide at least the advantages described below. Accordingly, an aspect of the present disclosure is to provide an electronic device for addressing the above-mentioned problems and the tasks described in the present disclosure.

In accordance with an aspect of the present disclosure, an electronic device is provided. The electronic device may include a housing, a touch screen display configured to be located in the housing, be exposed through a first region of the housing, and include a first edge and a second edge parallel to the first edge, a microphone configured to be located in the housing and be exposed through a second region of the housing, at least one speaker configured to be located in the housing and be exposed to a third region of the housing, a wireless communication circuit configured to be located in the housing, a processor configured to be located in the housing and be electrically connected with the touch screen display, the microphone, the at least one speaker, and the wireless communication circuit, and a memory configured to be located in the housing and be electrically connected with the processor. Instructions stored in the memory, when executed, may cause the processor to output a home screen including a plurality of application icons in a matrix pattern, receive a gesture input from the first edge to the second edge, and output a user interface on the touch screen display. The user interface may include a button for allowing a user to call a first operation and a plurality of cards. The first operation may include receiving a user input through at least one of the touch screen display or the microphone, transmitting data associated with the user input to an external server via the wireless communication circuit, receiving a response via the wireless communication circuit from the external server, and performing a task by allowing the electronic device to have a series of states. The user input may include a request for performing the task using at least one of application programs. The response may include information about the series of states for the electronic device to perform the task. At least one of the cards may be updated by a second operation including receiving a first notification generated from the application program installed in the electronic device or a third operation including receiving a second notification from the external server to update the cards. The instructions, when executed, may cause the processor to output a graphic indication along at least a portion of the first edge on the touch screen display when receiving at least one of the first notification and the second notification.

In accordance with another aspect of the present disclosure, an electronic device is provided. The electronic device may include a housing, a touch screen display configured to be located in the housing, be exposed through a first region of the housing, and include a first edge and a second edge parallel to the first edge, a microphone configured to be located in the housing and be exposed through a second region of the housing, at least one speaker configured to be located in the housing and be exposed to a third region of the housing, a wireless communication circuit configured to be located in the housing, a processor configured to be located in the housing and be electrically connected with the touch screen display, the microphone, the at least one speaker, and the wireless communication circuit, and a memory configured to be located in the housing and be electrically connected with the processor. Instructions stored in the memory, when executed, may cause the processor to output one of a plurality of pages on the touch screen display, update cards based on at least one of first data stored in the memory and second data received from an external device, determine whether a page output on the touch screen display corresponds to a home screen, and output a graphic indication on the home screen based on the determined result.

In accordance with another aspect of the present disclosure, an electronic device is provided. The electronic device may include a housing, a touch screen display configured to be located in the housing, be exposed through a first region of the housing, and include a first edge and a second edge parallel to the first edge, a microphone configured to be located in the housing and be exposed through a second region of the housing, at least one speaker configured to be located in the housing and be exposed to a third region of the housing, a wireless communication circuit configured to be located in the housing, a processor configured to be located in the housing and be electrically connected with the touch screen display, the microphone, the at least one speaker, and the wireless communication circuit, and a memory configured to be located in the housing and be electrically connected with the processor. Instructions stored in the memory, when executed, may cause the processor to output a home screen including a plurality of application icons in a matrix pattern, receive a gesture input from the first edge to the second edge, and output a user interface including at least one card. Each of the cards may be updated by (1) a first operation including receiving a user input through at least one of the touch screen display or the microphone, transmitting data associated with the user input to an external server via the wireless communication circuit, receiving a response via the wireless communication circuit from the external server, and performing a task by allowing the electronic device to have a series of states, (2) a second operation including receiving a first notification generated from an application program installed in the electronic device, and (3) a third operation including receiving a second notification from the external server to update a card. The user input may include a request for performing the task using at least one of application programs. The response may include information about the series of states for the electronic device to perform the task. The instructions may cause the processor to output a graphic indication along at least a portion of the first edge on the touch screen display when receiving at least one of the first notification and the second notification.

According to embodiments disclosed in the present disclosure, a user may immediately verify whether content is updated.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
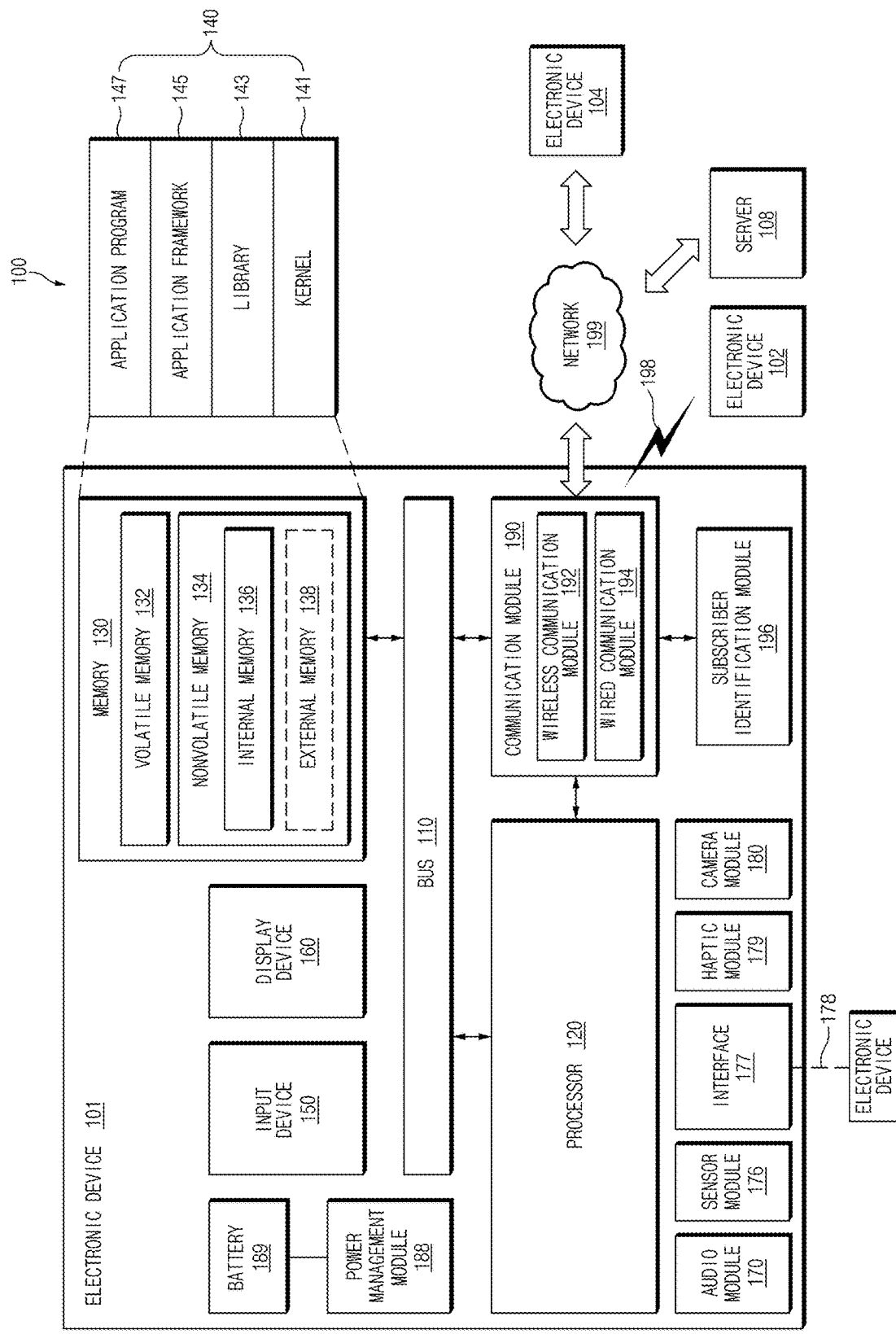
FIG. 1 illustrates a block diagram of a configuration of an electronic device in a network environment according to various embodiments of the present disclosure.

FIG. 1 illustrates a block diagram of an electronic device 101 in a network environment 100, according to various embodiments of the present disclosure.

An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 1, under the network environment 100, the electronic device 101 (e.g., a user terminal 200) may communicate with an electronic device 102 through local wireless communication via network 198 or may communication with an electronic device 104 or a server 108 through a network 199. According to an embodiment, the electronic device 101 may communicate with the electronic device 104 through the server 108.

According to an embodiment, the electronic device 101 may include a bus 110, a processor 120, a memory 130, an input device 150 (e.g., a micro-phone or a mouse), a display device 160, an audio module 170, a sensor module 176, an interface 177, a haptic module 179, a camera module 180, a power management module 188, a battery 189, a communication module 190, and a subscriber identification module 196. According to an embodiment, the electronic device 101 may not include at least one (e.g., the display device 160 or the camera module 180) of the above-described elements or may further include other element(s).

The bus 110 may interconnect the above-described elements 120 to 190 and may include a circuit for conveying signals (e.g., a control message or data) between the above-described elements.

The processor 120 may include one or more of a central processing unit (CPU), an application processor (AP), a graphic processing unit (GPU), an image signal processor (ISP) of a camera or a communication processor (CP). According to an embodiment, the processor 120 may be implemented with a system on chip (SoC) or a system in package (SiP). For example, the processor 120 may drive an operating system (OS) or an application to control at least one of another element (e.g., hardware or software element) connected to the processor 120 and may process and compute various data. The processor 120 may load a command or data, which is received from at least one of other elements (e.g., the communication module 190), into a volatile memory 132 to process the command or data and may store the result data into a nonvolatile memory 134.

The memory 130 may include, for example, the volatile memory 132 or the nonvolatile memory 134. The volatile memory 132 may include, for example, a random access memory (RAM) (e.g., a dynamic RAM (DRAM), a static RAM (SRAM), or a synchronous DRAM (SDRAM)). The nonvolatile memory 134 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 134 may be configured in the form of an internal memory 136 or the form of an external memory 138 which is available through connection only if necessary, according to the connection with the electronic device 101. The external memory 138 may further include a flash drive such as compact flash (CF), secure digital (SD), micro secure digital (Micro-SD), mini secure digital (Mini-SD), extreme digital (xD), a multimedia card (MMC), or a memory stick. The external memory 138 may be operatively or physically connected with the electronic device 101 in a wired manner (e.g., a cable or a universal serial bus (USB)) or a wireless (e.g., Bluetooth) manner.

For example, the memory 130 may store, for example, at least one different software element, such as a command or data associated with the program 140, of the electronic device 101. The program 140 may include, for example, a kernel 141, a library 143, an application framework 145 or an application program (interchangeably, "application") 147.

The input device 150 may include a microphone, a mouse, or a keyboard. According to an embodiment, the keyboard may include a keyboard physically connected or a virtual keyboard displayed through the display 160.

The display 160 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 101.

The audio module 170 may convert, for example, from a sound into an electrical signal or from an electrical signal into the sound. According to an embodiment, the audio module 170 may acquire sound through the input device 150 (e.g., a microphone) or may output sound through an output device (not illustrated) (e.g., a speaker or a receiver) included in the electronic device 101, an external electronic device (e.g., the electronic device 102 (e.g., a wireless speaker or a wireless headphone)) or an electronic device 106 (e.g., a wired speaker or a wired headphone) connected with the electronic device 101

The sensor module 176 may measure or detect, for example, an internal operating state (e.g., power or temperature) of the electronic device 101 or an external environment state (e.g., an altitude, a humidity, or brightness) to generate an electrical signal or a data value corresponding to the information of the measured state or the detected state. The sensor module 176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (FIRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 176 may further include a control circuit for controlling at least one or more sensors included therein. According to an embodiment, the sensor module 176 may be controlled by using the processor 120 or a processor (e.g., a sensor hub) separate from the processor 120. In the case that the separate processor (e.g., a sensor hub) is used, while the processor 120 is in a sleep state, the separate processor may operate without awakening the processor 120 to control at least a portion of the operation or the state of the sensor module 176.

According to an embodiment, the interface 177 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 178 may physically connect the electronic device 101 and the electronic device 106. According to an embodiment, the connector 178 may include, for example, an USB connector, an SD card/MMC connector, or an audio connector (e.g., a headphone connector).

The haptic module 179 may convert an electrical signal into mechanical stimulation (e.g., vibration or motion) or into electrical stimulation. For example, the haptic module 179 may apply tactile or kinesthetic stimulation to a user. The haptic module 179 may include, for example, a motor, a piezoelectric element, or an electric stimulator.

The camera module 180 may capture, for example, a still image and a moving picture. According to an embodiment, the camera module 180 may include at least one lens (e.g., a wide-angle lens and a telephoto lens, or a front lens and a rear lens), an image sensor, an image signal processor, or a flash (e.g., a light emitting diode or a xenon lamp).

The power management module 188, which is to manage the power of the electronic device 101, may constitute at least a portion of a power management integrated circuit (PMIC).

The battery 189 may include a primary cell, a secondary cell, or a fuel cell and may be recharged by an external power source to supply power at least one element of the electronic device 101.

The communication module 190 may establish a communication channel between the electronic device 101 and an external device (e.g., the first external electronic device 102, the second external electronic device 104, or the server 108). The communication module 190 may support wired communication or wireless communication through the established communication channel. According to an embodiment, the communication module 190 may include a wireless communication module 192 or a wired communication module 194. The communication module 190 may communicate with the external device through a first network 198 (e.g. a wireless local area network such as Bluetooth or infrared data association (IrDA)) or a second network 199 (e.g., a wireless wide area network such as a cellular network) through a relevant module among the wireless communication module 192 or the wired communication module 194.

The wireless communication module 192 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 192 supports cellar communication, the wireless communication module 192 may, for example, identify or authenticate the electronic device 101 within a communication network using the subscriber identification module (e.g., a SIM card) 196. According to an embodiment, the wireless communication module 192 may include a communication processor (CP) separate from the processor 120 (e.g., an application processor (AP)). In this case, the communication processor may perform at least a portion of functions associated with at least one of elements 110 to 196 of the electronic device 101 in substitute for the processor 120 when the processor 120 is in an inactive (sleep) state, and together with the processor 120 when the processor 120 is in an active state. According to an embodiment, the wireless communication module 192 may include a plurality of communication modules, each supporting only a relevant communication scheme among cellular communication, local wireless communication, or a GNSS communication.

The wired communication module 194 may include, for example, include a local area network (LAN) service, a power line communication, or a plain old telephone service (POTS).

For example, the first network 198 may employ, for example, Wi-Fi direct or Bluetooth for transmitting or receiving commands or data through wireless direct connection between the electronic device 101 and the first external electronic device 102. The second network 199 may include a telecommunication network (e.g., a computer network such as a LAN or a WAN, the Internet or a telephone network) for transmitting or receiving commands or data between the electronic device 101 and the second electronic device 104.

According to various embodiments, the commands or the data may be transmitted or received between the electronic device 101 and the second external electronic device 104 through the server 108 connected with the second network 199. Each of the first and second external electronic devices 102 and 104 may be a device of which the type is different from or the same as that of the electronic device 101. According to various embodiments, all or a part of operations that the electronic device 101 will perform may be executed by another or a plurality of electronic devices (e.g., the electronic devices 102 and 104 or the server 108). According to an embodiment, in the case that the electronic device 101 executes any function or service automatically or in response to a request, the electronic device 101 may not perform the function or the service internally, but may alternatively or additionally transmit requests for at least a part of a function associated with the electronic device 101 to any other device (e.g., the electronic device 102 or 104 or the server 108). The other electronic device (e.g., the electronic device 102 or 104 or the server 108) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
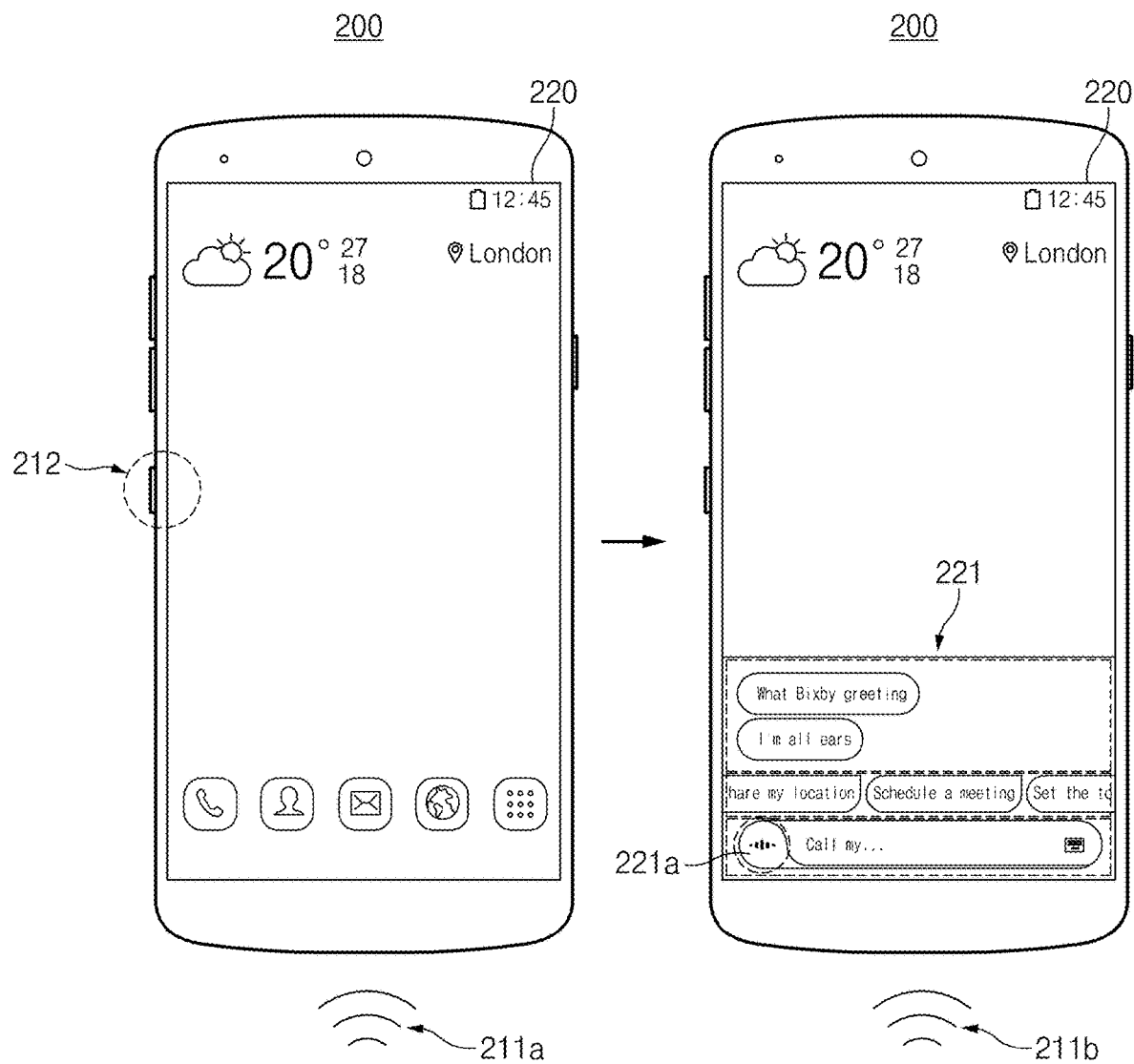
FIG. 2 illustrates a drawing of a process for executing an intelligence app of a user terminal according to an embodiment of the present disclosure.

FIG. 2 illustrates a drawing of a process for executing an intelligence app of a user terminal according to an embodiment of the present disclosure.

Referring to FIG. 2, a user terminal 200 (e.g., an electronic device 101 of FIG. 1) may receive a user input and may execute an intelligence app (e.g., a voice recognition app) which interworks with an intelligence agent.

According to an embodiment, the user terminal 200 may execute an intelligence app for recognizing a voice through a hardware key 212. For example, when receiving a user input through the hardware key 212, the user terminal 200 may display a user interface (UI) 221 of the intelligence app on a display 220. When a user touches a voice recognition button 221a in a state where the UI 221 of the intelligence app is displayed on the display 220, a voice 211b may be input to the user terminal 200. For another example, when the user keeps the hardware key 212 pushed, the voice 211b may be input to the user terminal 200.

According to an embodiment, the user terminal 200 may execute an intelligence app for recognizing a voice through a microphone (not shown). For example, when a specified voice 211a (e.g., "wake up!") is input through the microphone, the user terminal 200 may display the UI 221 of the intelligence app on the display 220.

Figure 3:
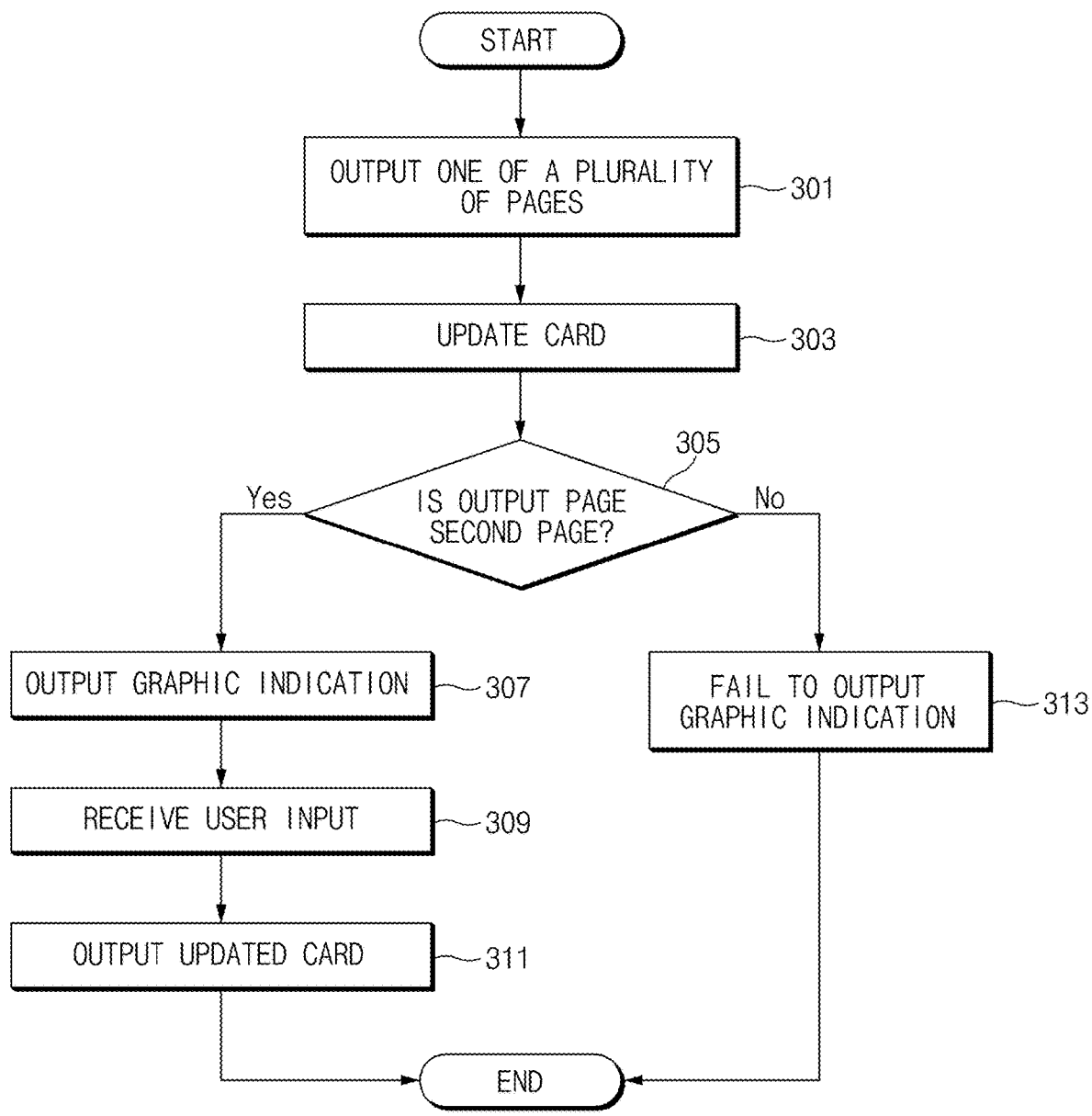
FIG. 3 illustrates a flowchart of an operation of a user terminal according to an embodiment.

FIG. 3 illustrates a flowchart of an operation of a user terminal according to an embodiment of the present disclosure.

Referring to FIG. 3, in operation 301, a user terminal 200 (or a processor 120 of FIG. 1) may output one of a plurality of pages. For example, the user terminal 200 may output one of first to four pages.

According to various embodiments, the first page in the present disclosure may be a screen on which a UI of a specified application is output. In an embodiment, the specified application may be an intelligence content curation app (e.g., BIXBY HOME, GOOGLE NOW, news, or the like). The intelligence content curation app may curate and provide related information and/or a related function based on a task/action and/or a subject/keyword which occur in the user terminal 200 or a server 108 of FIG. 1. Contents of the intelligence content curation app in the present disclosure may be described with reference to contents described in Korean Patent Application No. 10-2016-0083622 ("electronic device and method for providing information thereof"). The UI of the specified application may be an execution UI on which the specified application is executed. According to an embodiment, the UI of the specified application may include an interface (e.g., a button graphic user interface (GUI)) capable of entering an application associated with the specified application or an application (e.g., an intelligence app) capable of executing an additional operation.

According to an embodiment, a UI may include at least one car type of page (hereinafter referred to as "card"). Each card may include content (e.g., news, weather, or a schedule) curated based on at least one task/action or subject/keyword and may be updated. Further, the card may include an interface capable of entering another application. For example, each card may include an interface (e.g., a button GUI, a link, or the like) capable of executing an application (e.g., a web browser, a scheduler, or the like) associated with content.

The second page may be a home screen. The home screen may correspond to a home button included in the user terminal 200 or may be a page initially output after the user terminal 200 is booted. The home screen in the present disclosure may refer to a page adjacent to the first page. For example, when a gesture input corresponding to an operation of turning a page is received once in a state where the first page is output, the home screen may be output. According to an embodiment, the home screen may include an interface (e.g., an icon), a widget, or the like for executing an application. For example, the home screen may include an interface or a widget for execution, located in a matrix pattern.

According to an embodiment, each of the third page and the fourth page may refer to a page extended or added to the home screen. Each of the third page and the fourth page may include an icon, a widget, or the like. According to an embodiment, the number of pages is not limited to the above-mentioned example.

The term "home screen" used herein may refer to a set of a plurality of pages including all the above-mentioned first to four pages depending on a type or a setting of an electronic device. Further, the second page may refer to a main page of the home screen, but, for convenience of description, the term "home screen" in the present disclosure may be used as a page adjacent to the first page on which a screen where a specified application is executed is displayed.

In operation 303, the user terminal 200 according to an embodiment may update at least one of cards of the specified application. For example, the user terminal 200 may ascertain its location using a global positioning system (GPS) sensor. When a location of the user terminal 200 is changed, the user terminal 200 may update a card capable of being provided from each location.

For another example, the user terminal 200 may update a card based on data stored in a memory 130 of FIG. 1. For example, a schedule of a user may be stored in the memory 130. When a time corresponding to the schedule is near, an application (e.g., a scheduler) which manages the schedule may provide a notification for updating a card associated with the schedule to the specified application. The specified application may receive the notification and may update a card capable of verifying the schedule.

According to an embodiment, when a predetermined time elapses from a time when the user enters a specified card, the user terminal 200 may update the specific card. In other words, the user terminal 200 may update the specific card to request the user to verify the specific card.

According to an embodiment, the user terminal 200 may update a card based on a specified period. For another example, when a user input is received (e.g., when a refresh button is pushed), the user terminal 200 may update the card. Alternatively, when receiving content or an update notification from an application (e.g., an application program 147 of FIG. 1) or a server (e.g., the server 108), the user terminal 200 may update the card immediately or after a predetermined time.

In operation 305, the user terminal 200 according to an embodiment may determine whether a page output on a display 220 of FIG. 2 is the second page (or the home screen). When the output page is the second page, in operation 307, the user terminal 200 may output the second page and a graphic indication. The graphic indication may be an indication indicating that the card is updated and may include a specified shape (e.g., a graphic symbol or an image) or a character. For example, the graphic indication may have a quadrangle or a semicircular shape. For example, the graphic indication may be referred to as an edge lightening. The edge lightening may refer to an operation in which an edge portion of a display panel is lit. For another example, when the card is updated, the user terminal 200 may vibrate and may allow a light-emitting device included in the user terminal 200 to emit light.

According to an embodiment, when receiving a notification from the application or the server, the user terminal 200 may output a graphic indication. In other words, since a card is able to be updated when receiving the notification from the application or the server, the user terminal 200 may output a graphic indication. For another example, the user terminal 200 may receive a notification of updating a card from the application or the server and may output a graphic indication.

In operation 309, the user terminal 200 according to an embodiment may receive a user input. For example, when the user input a user gesture capable of moving the second page to the first page or when he or she touches or drags a graphic indication, the user terminal 200 may determine that the user input is received.

When the user input is received, in operation 311, the user terminal 200 according to an embodiment may enter the first page and may output a UI including the updated card. For example, when a famous restaurant card is updated as a location of the user terminal 200 is changed, the user terminal 200 may enter the first page and may output the updated famous restaurant card on the display 220.

Meanwhile, when the page output in operation 305 is not the second page, in operation 313, the user terminal 200 may fail to output a graphic indication. For example, when a card is updated in a state where the third page is output, the user terminal 200 may fail to output a graphic indication.

Figure 4:
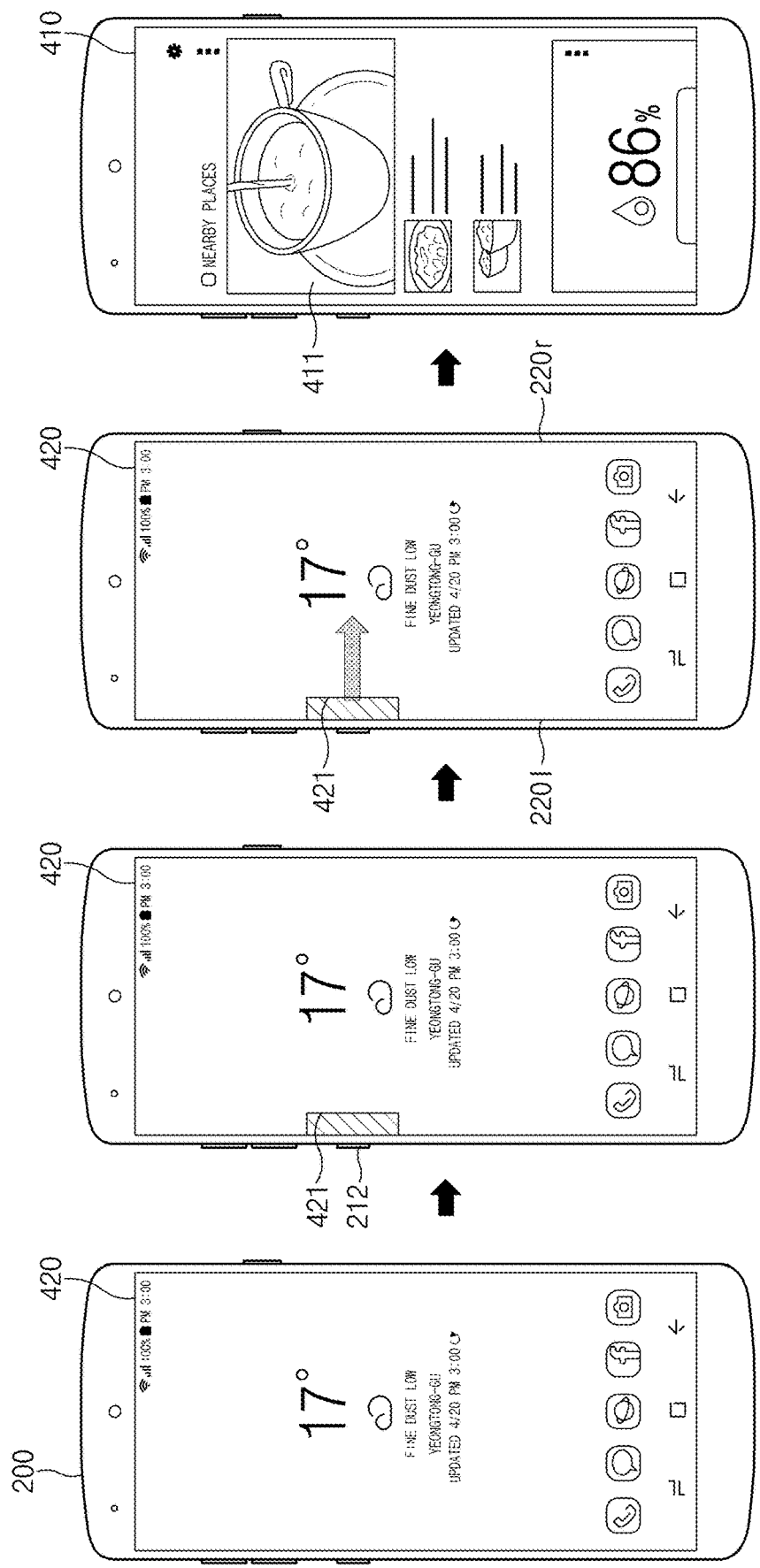
FIG. 4 illustrates a drawing of process for changing a page through a graphic indication when a card is updated, according to an embodiment of the present disclosure.

FIG. 4 illustrates a drawing of a process for changing a page through a graphic indication when a card is updated, according to an embodiment of the present disclosure.

Referring to FIG. 4, when a card is updated in a state where a second page 420 (or a home screen) is output, a user terminal 200 (e.g., a processor 120 of FIG. 1) may output a graphic indication 421 on a specified region. For example, the user terminal 200 may output the graphic indication 421 near a hardware key 212.

For another example, the user terminal 200 may display the graphic indication 421 based on a location of a first page 410. In other words, in a state where the second page 420 is output, the first page 410 may be located in the direction of a first edge 220l with respect to the second page 420. When a gesture input from the first edge 220l to a second edge 220r is received in a state where the second page 420 is output, the first page 410 may be output. In this case, the graphic indication 421 may be located on the first edge 220l in a state where the second page 420 is output.

According to an embodiment, when a user input is received through the graphic indication 421, the user terminal 200 may change (or move) the second page 420 to the first page 410. For example, when the user touches the graphic indication 421 or when he or she drags the graphic indication 421 in a specified direction, the user terminal 200 may change the second page 420 to the first page 410. The first page 410 may include an updated card 411. Thus, the user may verify the updated card 411.

According to an embodiment, the user terminal 200 may preset a card to be output on the first page 410. For example, the user terminal 200 may set to output only a first card among first to third cards based on a user input. In this case, although the second card and the third card are updated, they may fail to be output on the first page 410.

Figure 5:
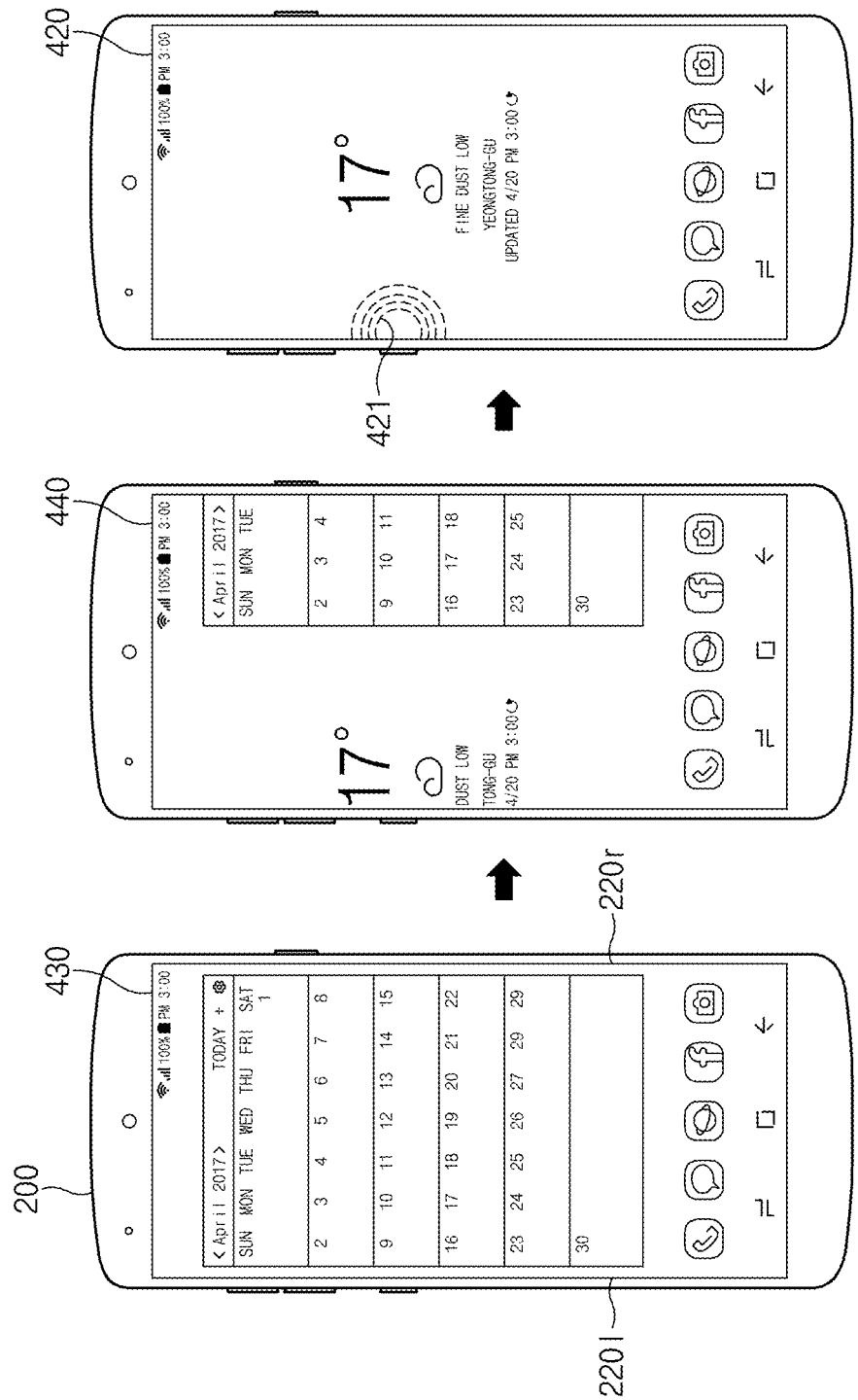
FIG. 5 illustrates a drawing of a user terminal for outputting a graphic indication on a home screen when a card is updated, according to an embodiment of the present disclosure.

FIG. 5 illustrates a drawing of a user terminal for outputting a graphic indication on a home screen when a card is updated, according to an embodiment of the present disclosure.

Referring to FIG. 5, a user terminal 200 (e.g., a processor 120 of FIG. 1) may output a graphic indication 421 on only a second page 420 (or a home screen). In other words, although a card is updated, the user terminal 200 may fail to output the graphic indication 421 on a third page 430 (or a fourth page 440).

According to an embodiment, when at least one card is updated and when a page is changed from the third page 430 to the second page 420, the user terminal 200 may output the graphic indication 421 on the second page 420. For example, as described above, although a card is updated in a situation where the third page 430 is output, the user terminal 200 may fail to output the graphic indication 421.

According to an embodiment, the second page 420 may be located in the direction of a first edge 220l with respect to the third page 430. Thus, when a gesture input from the first edge 220l to a second edge 220r is received in a state where the third page 430 is output, the user terminal 200 may change a page from the third page 430 to the second page 420. Since the user terminal 200 is able to output a graphic indication on the second page 420, when the page is changed, the user terminal 200 may output the graphic indication 421 on the second page 420. A process of an operation after the graphic indication 421 is displayed may be substantially the same as a process described with reference to FIGS. 3 and 4.

For another example, when a gesture input from the second edge 220r to the first edge 220l is received in a state where the second page 420 is output, the user terminal 200 may change a page from the second page 420 to the third page 430. Since the user terminal 200 is unable to output a graphic indication on the third page 430, when the page is changed, the user terminal 200 may fail to output the graphic indication 421 on the third page 430.

Figure 6:
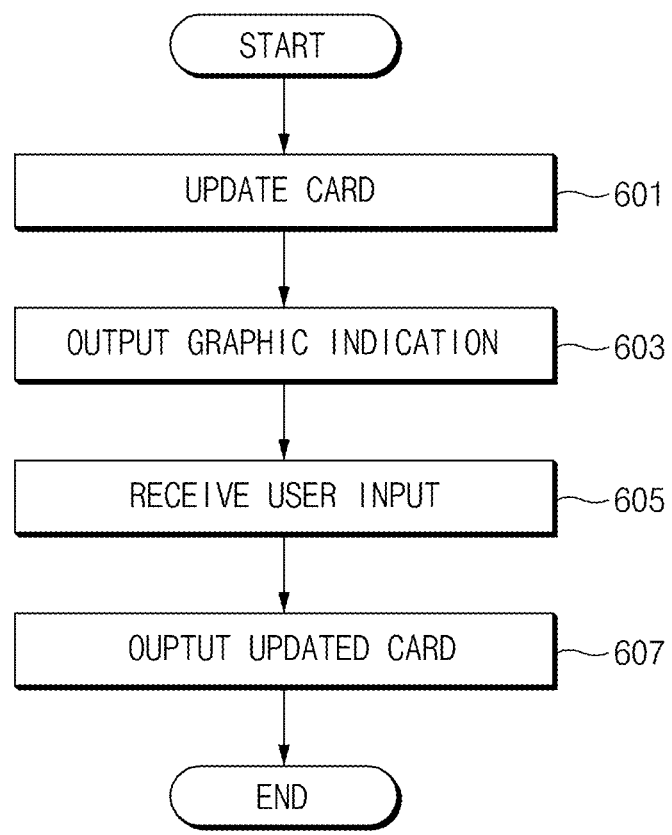
FIG. 6 illustrates a flowchart of an operation of a user terminal according to another embodiment of the present disclosure.

FIG. 6 illustrates a flowchart of an operation of a user terminal according to another embodiment of the present disclosure.

Referring to FIG. 6, in operation 601, a user terminal 200 (or a processor 120 of FIG. 1) according to an embodiment may update at least one card. Operation 601 may be substantially the same as operation 303 described with reference to FIG. 3.

In operation 603, the user terminal 200 according to an embodiment may output a graphic indication. For example, when the at least one card is updated, the user terminal 200 may output the graphic indication irrespective of an output page. In other word, the user terminal 200 may output a graphic indication on a third page or may output the graphic indication on a fourth page.

According to an embodiment, the user terminal 200 may output a different graphic indication for each page. For example, the user terminal 200 may output a graphic indication having different brightness for each page. For another example, the user terminal 200 may output a graphic indication having a different size for each page.

In operation 605, the user terminal 200 may receive a user input. For example, when a user inputs a user gesture capable of moving from a second page to a first page or when he or she touches or drags a graphic indication, the user terminal 200 may determine that the user input is received.

When the user input is received, in operation 609, the user terminal 200 may output the updated card. For example, when the user input is received in a state where a graphic indication is output on the third page, the user terminal 200 may change the third page to the first page and may output the updated card.

Figure 7:
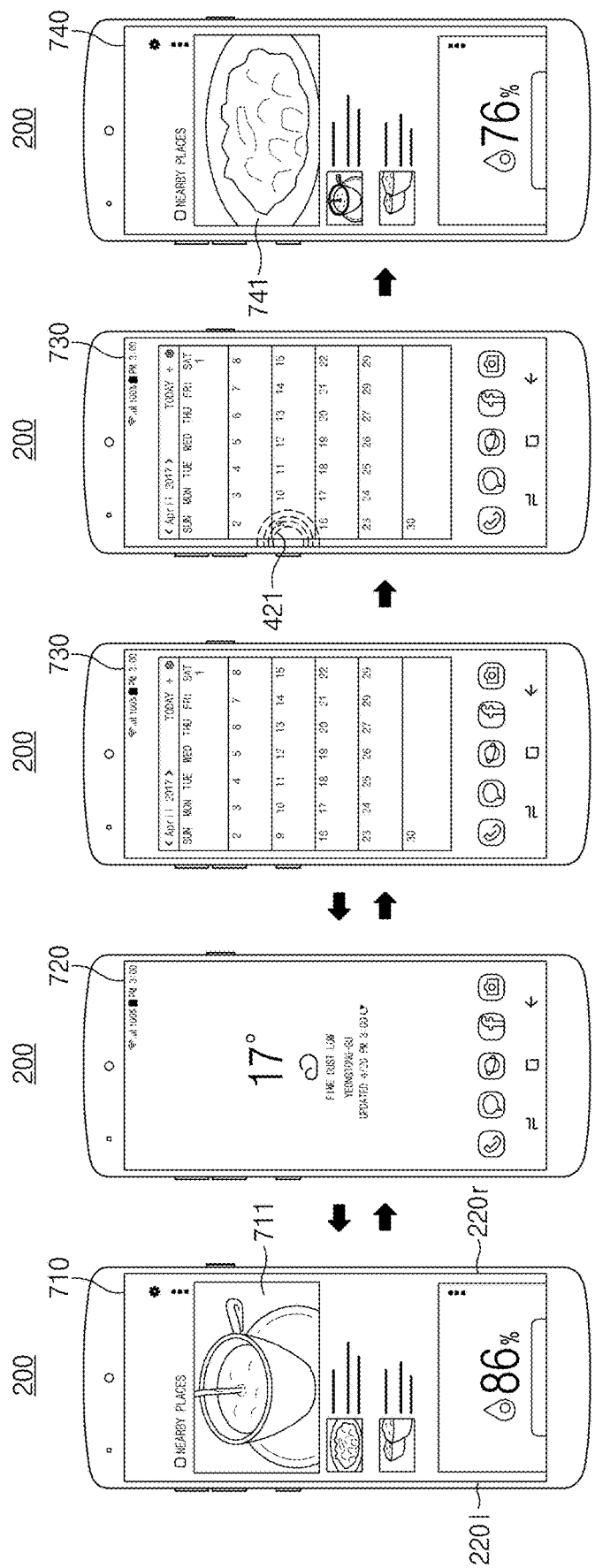
FIG. 7 illustrates a drawing of a user terminal for outputting a graphic indication on a third page according to an embodiment of the present disclosure.

FIG. 7 illustrates a drawing of a user terminal for outputting a graphic indication on a third page according to an embodiment of the present disclosure.

Referring to FIG. 7, a user terminal 200 (or a processor 120 of FIG. 1) may change a page. When a gesture input from a second edge 220r to a first edge 2201 is received in a state where a first page 710 is output, the user terminal 200 may change the first page 710 to a second page 720. Further, when a gesture input from the second edge 220r to the first edge 2201 is received in a state where the second page 720 is output, the user terminal 200 may change the second page 720 to a third page 730.

For another example, when a gesture input from the first edge 2201 to the second edge 220r is received in a state where the second page 720 is output, the user terminal 200 may change the second page 720 to the first page 710. Further, when a gesture input from the first edge 2201 to the second edge 220r is received in a state where the third page 730 is output, the user terminal 200 may change the third page 730 to the second page 720.

According to an embodiment, the user terminal 200 may change a page based on a user input which is input through a graphic indication 421. For example, when a card is updated, the user terminal 200 may output the graphic indication 421 on the third page 730. In this case, when a user touches the graphic indication 421 or when he or she drags the graphic indication 421 in a specified direction, the user terminal 200 may change the third page 730 to the first page 710.

According to an embodiment, since an updated card 741 is included in the first page 710, the user may verify new information through the updated card 741. For example, comparing a card 711 prior to the update with the updated card 741, the user may verify that there is a coffee shop or a restaurant near him or her.

Figure 8:
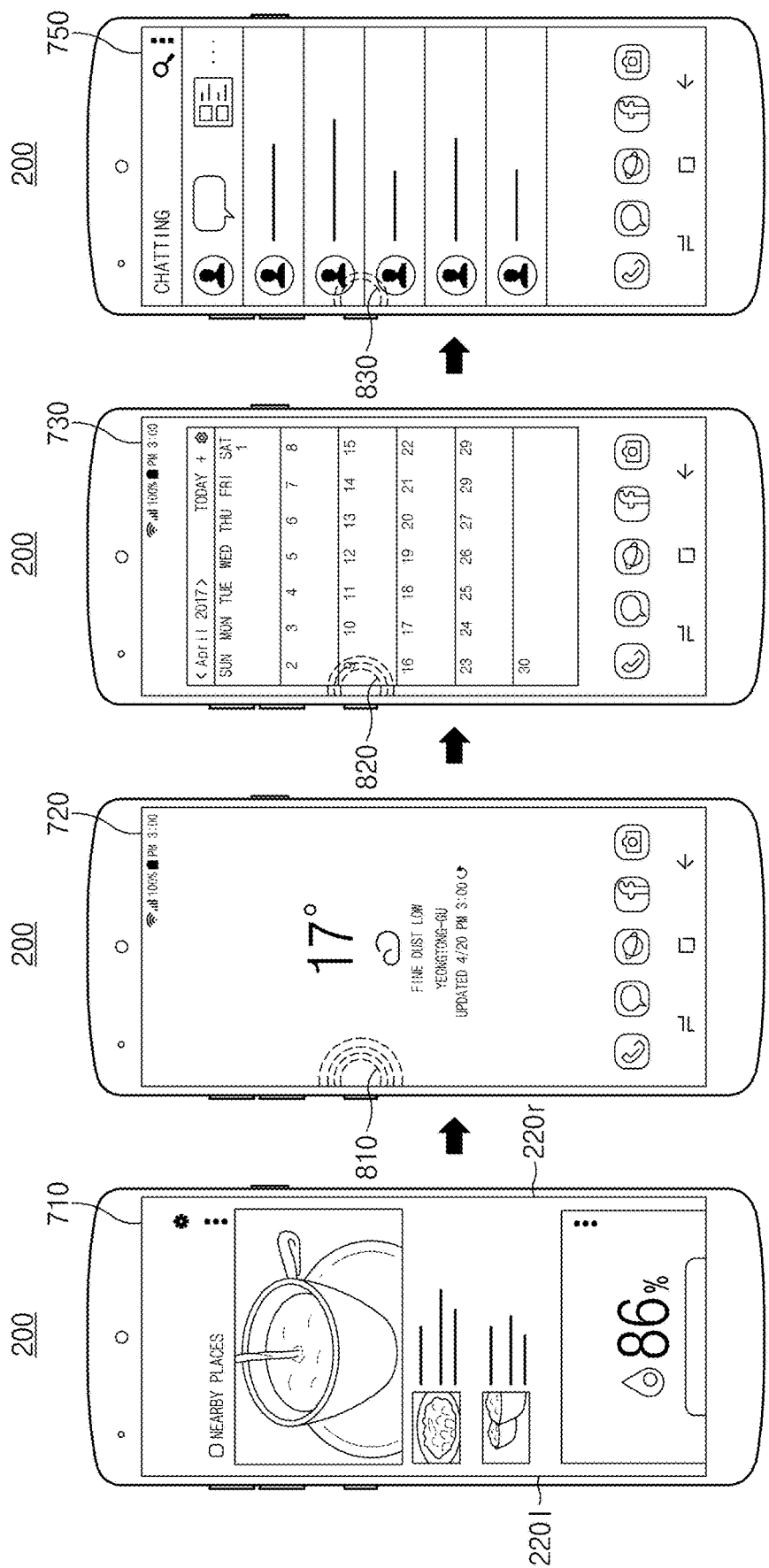
FIG. 8 illustrates a drawing of a user terminal for outputting different graphic indications according to various embodiments of the present disclosure.

FIG. 8 illustrates a drawing of a user terminal for outputting different graphic indications according to various embodiments of the present disclosure.

Referring to FIG. 8, a user terminal 200 (or a processor 120 of FIG. 1) may output a different graphic indication for each page. For example, a graphic indication may be brighter on a page located closer to a first page 710. On the other hand, a graphic indication may be darker on a page located further from the first page 710. In other words, a graphic indication 810 output on a second page 720 may be brighter than a graphic indication 820 output on a third page 730. Further, the graphic indication 820 output on the third page 730 may be brighter than a graphic indication 830 output on a fourth page 750.

For another example, the user terminal 200 may output each of the graphic indications 810, 820, and 830 for each page to vary in size. For example, as going from the second page 720 to the fourth page 750, each of the graphic indications 810, 820, and 830 may be smaller in size.

For another example, the user terminal 200 may output each of the graphic indications 810, 820, and 830 for each page to vary in shape. For example, each of the graphic indications 810, 820, and 830 respectively output on the second to fourth pages 720, 730, and 750 may vary in shape.

For another example, the user terminal 200 may output the graphic indication 810 based on a direction in which the first page 710 is located. For example, the first page 710 may be located in the direction of a first edge 2201 with respect to the second page 720. Thus, the user terminal 200 may output the graphic indication 810 near the first edge 2201 in a state where the second page 720 is output.

For another example, when a gesture input from a second edge 220r to the first edge 2201 is received in a state where the fourth page 750 is output, the first page 710 may be output. In this case, although not illustrated, the user terminal 200 may output the graphic indication 810 near the second edge 220r in a state where the fourth page 750 is output. In this case, a graphic indication output near the first edge 2201 of the fourth page 750 may differ from a graphic indication output near the second edge 220r of the fourth page 750. For example, the graphic indication output near the first edge 2201 may be located far from the first page 710. The graphic indication output near the second edge 220r may be located close to the first page 710. Thus, the graphic indication output near the second edge 220r may be brighter than a graphic indication output near the first edge 2201.

Figure 9:
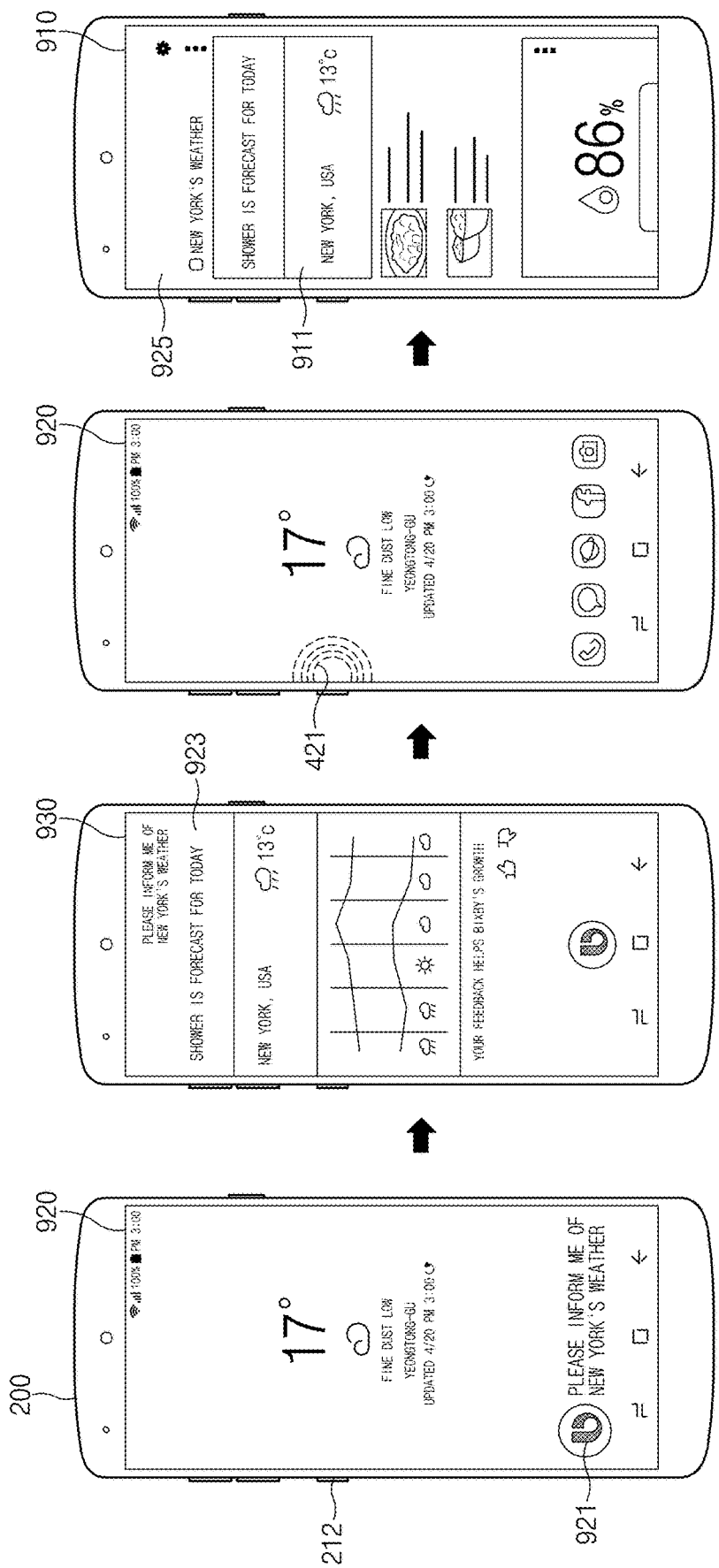
FIG. 9 illustrates a drawing of a user terminal for updating a card through an application and outputting whether the card is updated, according to an embodiment of the present disclosure.

FIG. 9 illustrates a drawing of a user terminal for updating a card through an application and outputting whether the card is updated, according to an embodiment of the present disclosure.

Referring to FIG. 9, a user terminal 200 according to an embodiment may execute a first application 921 (e.g., an intelligence app (e.g., BIXBY)) in a state where a second page 920 is output. For example, when a user pushes a hardware key 212, the user terminal 200 may execute the first application 921.

According to an embodiment, the first application 921 may execute a second application 923 based on speech of the user. For example, when the user speaks "please inform me of New York's weather", the first application 921 may execute the second application 923 (e.g., a weather application) and may search for New York's weather. The user terminal 200 may output the result found by the weather application. According to an embodiment, the second application 923 may transmit data associated with the executed result to the first application 921.

According to an embodiment, the user terminal 200 may update a card based on the found result. For example, a specified application 925 may receive data associated with the executed result as a notification from the first application 921 or the second application 923. The specified application 925 may update the card based on the notification.

According to an embodiment, when the card is updated, the user terminal 200 may output a graphic indication 421. When the user touches the graphic indication 421 or when he or she drags the graphic indication 421 in a specified direction, the user terminal 200 may enter a first page 910. Further, the user terminal 200 may output a card 911 updated in connection with the first application 921 or the second application 923 on the first page 910.

An electronic device according to an embodiment of the present disclosure may include a housing, a touch screen display configured to be located in the housing, be exposed through a first region of the housing, and include a first edge and a second edge parallel to the first edge, a microphone configured to be located in the housing and be exposed through a second region of the housing, at least one speaker configured to be located in the housing and be exposed to a third region of the housing, a wireless communication circuit configured to be located in the housing, a processor configured to be located in the housing and be electrically connected with the touch screen display, the microphone, the at least one speaker, and the wireless communication circuit, and a memory configured to be located in the housing and be electrically connected with the processor. Instructions stored in the memory, when executed, may cause the processor to output a home screen including a plurality of application icons in a matrix pattern, receive a gesture input from the first edge to the second edge, and output a user interface on the touch screen display. The user interface may include a button for allowing a user to call a first operation and a plurality of cards. The first operation may include receiving a user input through at least one of the touch screen display or the microphone, transmitting data associated with the user input to an external server via the wireless communication circuit, receiving a response via the wireless communication circuit from the external server, and performing a task by allowing the electronic device to have a series of states. The user input may include a request for performing the task using at least one of application programs. The response may include information about the series of states for the electronic device to perform the task. At least one of the cards may be updated by (1) a second operation including receiving a first notification generated from the application program installed in the electronic device or (2) a third operation including receiving a second notification from the external server to update the cards. The instructions, when executed, may cause the processor to output a graphic indication along at least a portion of the first edge on the touch screen display when receiving at least one of the first notification and the second notification.

The touch screen display according to an embodiment of the present disclosure may include a third edge and a fourth edge which are perpendicular to the first edge and the second edge and have a shorter length than the first edge and the second edge.

The graphic indication according to an embodiment of the present disclosure may include a bar shape overlapped with the home screen.

The instructions according to an embodiment of the present disclosure may cause the processor to fail to output the graphic indication on another screen except for the home screen.

The instructions according to an embodiment of the present disclosure may cause the processor to output the user interface when receiving the gesture input.

The instructions according to an embodiment of the present disclosure may cause the processor to output the graphic indication before receiving the gesture input.

The electronic device according to an embodiment of the present disclosure may further include a sensor configured to be located in the housing and be electrically connected with the processor. The instructions according to an embodiment of the present disclosure may cause the processor to update the cards based on data measured by the sensor.

The instructions according to an embodiment of the present disclosure may cause the processor to update the cards based on data stored in the memory.

The instructions according to an embodiment of the present disclosure may cause the processor to update the cards for each predetermined period.

The instructions according to an embodiment of the present disclosure may cause the processor to update the cards based on the user input.

The electronic device according to an embodiment of the present disclosure may further include a motor configured to be located in the housing and be electrically connected with the processor. The instructions according to an embodiment of the present disclosure may cause the processor to allow the motor to vibrate when receiving at least one of the first notification and the second notification.

The electronic device according to an embodiment of the present disclosure may further include a light-emitting device configured to be exposed to a fourth region of the housing. The instructions according to an embodiment of the present disclosure may cause the processor to allow the light-emitting device to emit light when receiving at least one of the first notification and the second notification.

The instructions according to an embodiment of the present disclosure may cause the processor to set cards associated with the graphic indication based on the user input.

The instructions according to an embodiment of the present disclosure may cause the processor to output the updated cards on the display in a specified order.

An electronic device according to an embodiment of the present disclosure may include a housing, a touch screen display configured to be located in the housing, be exposed through a first region of the housing, and include a first edge and a second edge parallel to the first edge, a microphone configured to be located in the housing and be exposed through a second region of the housing, at least one speaker configured to be located in the housing and be exposed to a third region of the housing, a wireless communication circuit configured to be located in the housing, a processor configured to be located in the housing and be electrically connected with the touch screen display, the microphone, the at least one speaker, and the wireless communication circuit, and a memory configured to be located in the housing and be electrically connected with the processor. Instructions stored in the memory, when executed, may cause the processor to output one of a plurality of pages on the touch screen display, update cards based on at least one of first data stored in the memory and second data received from an external device, determine whether a page output on the touch screen display corresponds to a home screen, and output a graphic indication on the home screen based on the determined result.

The instructions according to an embodiment of the present disclosure may cause the processor to output a user interface on one of the plurality of pages.

The user interface according to an embodiment of the present disclosure may include a button for receiving a user input through the microphone and the cards.

The instructions according to an embodiment of the present disclosure may cause the processor to update the cards based on a user input.

The instructions according to an embodiment of the present disclosure may cause the processor to change the output page based on a first gesture input from the first edge to the second edge or a second gesture input from the second edge to the first edge.

An electronic device according to an embodiment of the present disclosure may include a housing, a touch screen display configured to be located in the housing, be exposed through a first region of the housing, and include a first edge and a second edge parallel to the first edge, a microphone configured to be located in the housing and be exposed through a second region of the housing, at least one speaker configured to be located in the housing and be exposed to a third region of the housing, a wireless communication circuit configured to be located in the housing, a processor configured to be located in the housing and be electrically connected with the touch screen display, the microphone, the at least one speaker, and the wireless communication circuit, and a memory configured to be located in the housing and be electrically connected with the processor. Instructions stored in the memory, when executed, may cause the processor to output a home screen including a plurality of application icons in a matrix pattern, receive a gesture input from the first edge to the second edge, and output a user interface including at least one card. Each of the cards may be updated by (1) a first operation including receiving a user input through at least one of the touch screen display or the microphone, transmitting data associated with the user input to an external server via the wireless communication circuit, receiving a response via the wireless communication circuit from the external server, and performing a task by allowing the electronic device to have a series of states and (2) a second operation including receiving a first notification generated from an application program installed in the electronic device, and (3) a third operation including receiving a second notification from the external server to update a card. The user input may include a request for performing the task using at least one of application programs. The response may include information about the series of states for the electronic device to perform the task. The instructions may cause the processor to output a graphic indication along at least a portion of the first edge on the touch screen display when receiving at least one of the first notification and the second notification.

Figure 10:
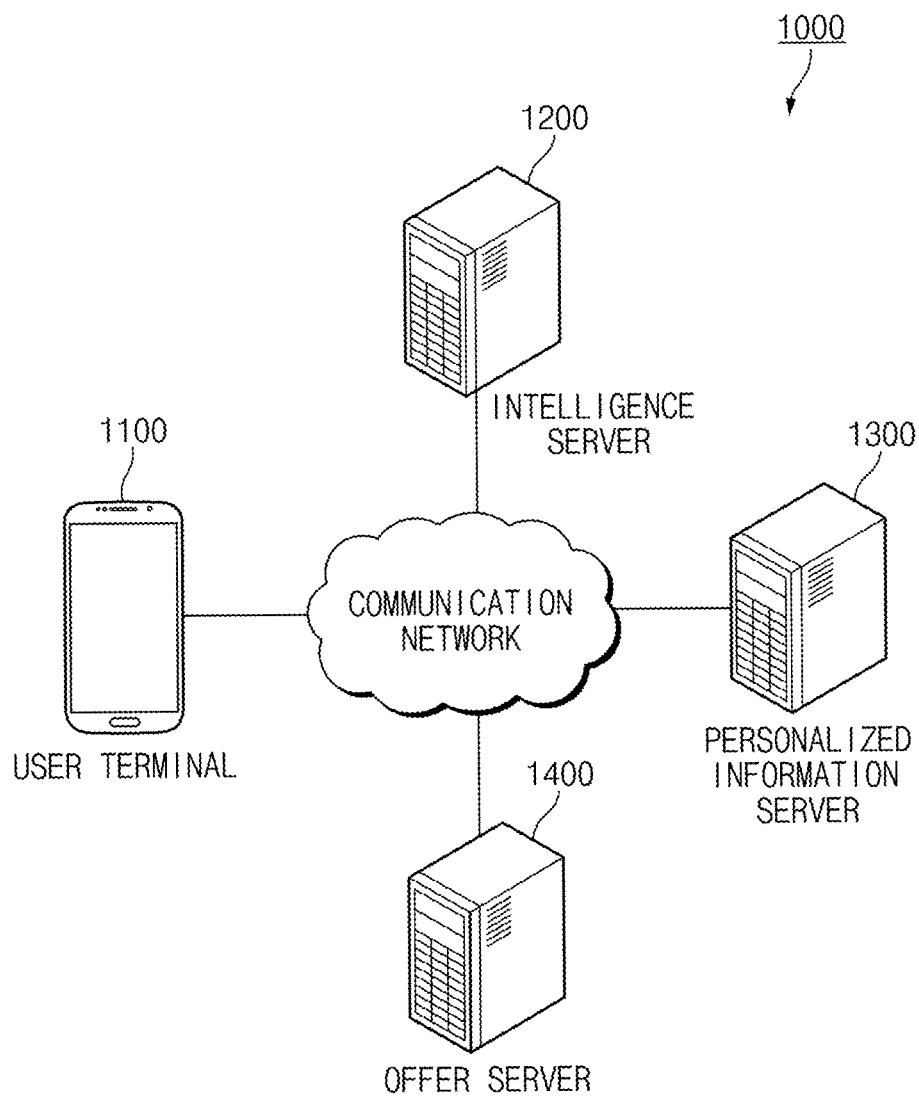
FIG. 10 illustrates a drawing of an integrated intelligence system according to various embodiments of the present disclosure.

FIG. 10 illustrates a drawing of an integrated intelligence system according to various embodiments of the present disclosure.

Referring to FIG. 10, an integrated intelligence system 1000 may include a user terminal 1100, an intelligence server 1200, a personalized information server 1300, or an offer server 1400.

The user terminal 1100 may provide a service necessary for a user through an app (or an application program) (e.g., an alarm app, a message app, a photo (gallery) app, or the like) stored in the user terminal 1100. For example, the user terminal 1100 may execute and operate another app through an intelligence app (or a voice recognition app) stored in the user terminal 1100. The user terminal 1100 may receive a user input for executing and operating the other app through the intelligence app. The user input may be received through, for example, a physical button, a touch pad, a voice input, a remote input, or the like. According to an embodiment, the user terminal 1100 may correspond to each of various terminals devices (or various electronic devices) connectable to the Internet, for example, a mobile phone, a smartphone, a personal digital assistant (PDA), or a notebook computer.

According to an embodiment, the user terminal 1100 may receive speech of the user as a user input. The user terminal 1100 may receive the speech of the user and may generate a command to operate an app based on the speech of the user. Thus, the user terminal 1100 may operate the app using the command.

The intelligence server 1200 may receive a voice input of the user over a communication network from the user terminal 1100 and may change the voice input to text data. In another example, the intelligence server 1200 may generate (or select) a path rule based on the text data. The path rule may include information about an action (or an operation) for performing a function of an app or information about a parameter necessary for executing the operation. Further, the path rule may include an order of the action of the app. The user terminal 1100 may receive the path rule and may select an app depending on the path rule, thus executing an action included in the path rule in the selected app.

For example, the user terminal 1100 may execute the action and may display a screen corresponding to a state of the user terminal 1100 which executes the action on its display. For another example, the user terminal 1100 may execute the action and may fail to display the result of performing the action on the display. The user terminal 1100 may execute, for example, a plurality of actions and may display only the result of performing some of the plurality of actions on the display. The user terminal 1100 may display, for example, only the result of executing an action of the final order on the display. For another example, the user terminal 1100 may receive an input of the user and may display the result of executing the action on the display.

The personalized information server 1300 may include a database in which user information is stored. For example, the personalized information server 1300 may receive user information (e.g., context information, app execution, or the like) from the user terminal 1100 and may store the received user information in the database. The intelligence server 1200 may receive the user information over the communication network from the personalized information server 1300 and may use the received user information when generating a path rule for a user input. According to an embodiment, the user terminal 1100 may receive user information over the communication network from the personalized information server 1300 and may use the received user information as information for managing the database.

The offer server 1400 may include a database which stores information about an introduction of a function or application in the user terminal 1100 or information about a function to be provided. For example, the offer server 1400 may include a database for a function of receiving user information of the user terminal 1100 from the personalized information server 1300 and allowing the user to use the received user information. The user terminal 1100 may receive the information about the function to be provided, over the communication network from the offer server 1400 and may provide the information the user.

Figure 11:
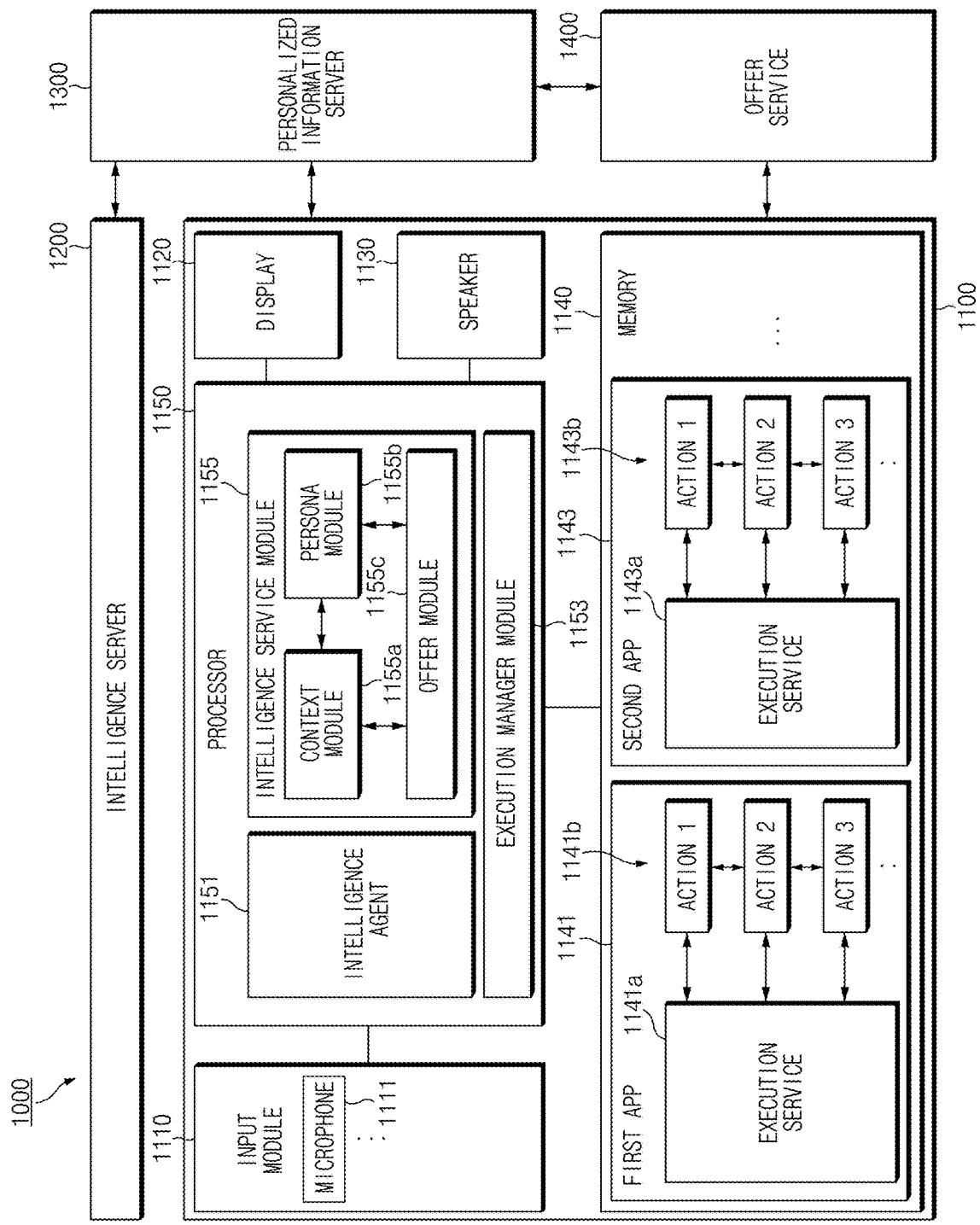
FIG. 11 illustrates a block diagram of a user terminal of an integrated intelligence system according to an embodiment of the present disclosure.

FIG. 11 illustrates a block diagram of a user terminal of an integrated intelligence system according to an embodiment of the present disclosure.

Referring to FIG. 11, a user terminal 1100 may include an input module 1110, a display 1120, a speaker 1130, a memory 1140, or a processor 1150. The user terminal 1100 may further include a housing. The elements of the user terminal 1100 may be received in the housing or may be located on the housing.

The input module 1110 according to an embodiment may receive a user input from a user. For example, the input module 1110 may receive a user input from an external device (e.g., a keyboard or a headset) connected to the input module 1110. For another example, the input module 1110 may include a touch screen (e.g., a touch screen display) combined with the display 1120. For another example, the input module 1110 may include a hardware key (or a physical key) located in the user terminal 1100 (or the housing of the user terminal 1100).

According to an embodiment, the input module 1110 may include a microphone 1111 capable of receiving speech of the user as a voice signal. For example, the input module 1110 may include a speech input system and may receive speech of the user as a voice signal via the speech input system.

The display 1120 according to an embodiment may display an image or video and/or a screen where an application is executed. For example, the display 1120 may display a graphic user interface (GUI) of an app.

According to an embodiment, the speaker 1130 may output a voice signal. For example, the speaker 1130 may output a voice signal generated in the user terminal 1100 to the outside.

According to an embodiment, the memory 1140 may store a plurality of apps 1141 and 1143. The plurality of apps 1141 and 1143 stored in the memory 1140 may be selected, executed, and operated according to a user input.

According to an embodiment, the memory 1140 may include a database capable of storing information necessary for recognizing a user input. For example, the memory 1140 may include a log database capable of storing log information. For another example, the memory 1140 may include a persona database capable of storing user information.

According to an embodiment, the memory 1140 may store the plurality of apps 1141 and 1143. The plurality of apps 1141 and 1143 may be loaded and operated. The plurality of apps 1141 and 1143 stored in the memory 1140 may be loaded and operated by an execution manager module 1153 of the processor 1150. The plurality of apps 1141 and 1143 may include execution services 1141*a* and 1143*a* for performing a function or a plurality of actions (or unit actions) 1141*b* and 1143*b*, respectively. The execution services 1141*a* and 1143*a* may be generated by the execution manager 1153 of the processor 1150 and may execute the plurality of actions 1141*b* and 1143*b*, respectively.

According to an embodiment, when the actions 1141*b* and 1143*b* of the apps 1141 and 1143 are executed, an execution state screen according to the execution of the actions 1141*b* and 1143*b* may be displayed on the display 1120. The execution state screen may be, for example, a screen of a state where the actions 1141*b* and 1143*b* are completed. The execution state screen may be, for example, a screen where execution of the actions 1141*b* and 1143*b* is in a partial landing state (e.g., when a parameter necessary for the actions 1141*b* and 1143*b* is not input).

The execution services 1141*a* and 1143*a* according to an embodiment may execute the actions 1141*b* and 1143*b*, respectively, depending on a path rule. For example, the execution services 1141*a* and 1143*a* may be generated by the execution manager module 1153, may receive an execution request depending on the path rule from the execution manager module 1153, and may execute the actions 1141*b* and 1143*b* depending on the execution request. When performance of the actions 1141*b* and 1143*b* is completed, the execution services 1141*a* and 1143*a* may transmit completion information to the execution manager module 1153.

According to an embodiment, when the plurality of actions 1141*b* and 1143*b* are respectively executed in the apps 1141 and 1143, the plurality of actions 1141*b* and 1143*b* may be sequentially executed. When execution of one action (e.g., action 1) is completed, the execution services 1141*a* and 1143*a* may open a next action (e.g., action 2) and may transmit completion information to the execution manager module 1153. Herein, opening any action may be understood as changing the any operation to an executable state or preparing execution of the any action. In other words, when the any operation is not opened, it may fail to be executed. When the completion information is received, the execution manager module 1153 may transmit a request to execute the next action (e.g., action 2) to an execution service. According to an embodiment, when the plurality of apps 1141 and 1143 are executed, they may be sequentially executed. When receiving completion information after execution of a final action of the first app 1141 is completed, the execution manager module 1153 may transmit a request to execute a first action of the second app 1143 to the execution service 1143*a*.

According to an embodiment, when the plurality of actions 1141*b* and 1143*b* are respectively executed in the apps 1141 and 1143, a result screen according to the execution of each of the plurality of executed actions 1141*b* and 1143*b* may be displayed on the display 1120. According to an embodiment, only some of a plurality of result screens according to the execution of the plurality of executed actions 1141*b* and 1143*b* may be displayed on the display 1120.

According to an embodiment, the memory 1140 may store an intelligence app (e.g., a voice recognition app) which interworks with an intelligence agent 1151. The app which interworks with the intelligence agent 1151 may receive and process speed of the user as a voice signal. According to an embodiment, the app which interworks with the intelligence agent 1151 may be operated by a specific input (e.g., an input through a hardware key, an input through a touch screen, or a specific voice input) input through the input module 1110.

According to an embodiment, the processor 1150 may control an overall operation of the user terminal 1100. For example, the processor 1150 may control the input module 1110 to receive a user input. The processor 1150 may control the display 1120 to display an image. The processor 1150 may control the speaker 1130 to output a voice signal. The processor 1150 may control the memory 1140 to fetch or store necessary information.

According to an embodiment, the processor 1150 may include the intelligence agent 1151, the execution manager module 1153, or an intelligent service module 1155. In an embodiment, the processor 11150 may execute instructions stored in the memory 1140 to drive the intelligence agent 1151, the execution manager module 1153, or the intelligent service module 1155. The several modules described in various embodiments of the present disclosure may be implemented in hardware or software. In various embodiments of the present disclosure, an operation performed by the intelligence agent 1151, the execution manager module 1153, or the intelligent service module 1155 may be understood as an operation performed by the processor 1150.

The intelligence agent 1151 according to an embodiment may generate a command to operate an app based on a voice signal received as a user input. The execution manager module 1153 according to an embodiment may receive the generated command from the intelligence agent 1151 and may select, execute, and operate the apps 1141 and 1143 stored in the memory 1140. According to an embodiment, the intelligent service module 1155 may manage information of the user and may use the information of the user to process a user input.

The intelligence agent 1151 may transmit a user input received through the input module 1110 to an intelligence server 1200.

According to an embodiment, the intelligence agent 1151 may preprocess the user input before transmitting the user input to the intelligence server 1200. According to an embodiment, to preprocess the user input, the intelligence agent 1151 may include an adaptive echo canceller (AEC) module, a noise suppression (NS) module, an end-point detection (EPD) module, or an automatic gain control (AGC) module. The AEC module may cancel an echo included in the user input. The NS module may suppress background noise included in the user input. The EPD module may detect an end point of a user voice included in the user input and may find a portion where there is a voice of a user. The AGC module may adjust volume of the user input to be suitable for recognizing and processing the user input. According to an embodiment, the intelligence agent 1151 may include all the preprocessing elements for performance. However, in another embodiment, the intelligence agent 1151 may include some of the processing elements to operate with a low power.

According to an embodiment, the intelligence agent 1151 may include a wake-up recognition module for recognizing calling of the user. The wake-up recognition module may recognize a wake-up command of the user through a voice recognition module. When receiving the wake-up command, the wake-up recognition module may activate the intelligence agent 1151 to receive a user input. According to an embodiment, the wake-up recognition module of the intelligence agent 1151 may be implemented in a low-power processor (e.g., a processor included in an audio codec). According to an embodiment, the intelligence agent 1151 may be activated according to a user input through a hardware key. When the intelligence agent 1151 is activated, an intelligence app (e.g., a voice recognition app) which interworks with the intelligence agent 1151 may be executed.

According to an embodiment, the intelligence agent 1151 may include a voice recognition module for executing a user input. The voice recognition module may recognize a user input for executing an action in an app. For example, the voice recognition module may recognize a limited user (voice) input for executing an action such as the wake-up command (e.g., speech like "a click" for executing an image capture operation while a camera app is executed). The voice recognition module which helps the intelligence server 1200 with recognizing a user input may recognize and quickly process, for example, a user command capable of being processed in the user terminal 1100. According to an embodiment, the voice recognition module for executing the user input of the intelligence agent 1151 may be implemented in an app processor.

According to an embodiment, the voice recognition module (including a voice recognition module of a wake-up module) in the intelligence agent 1151 may recognize a user input using an algorithm for recognizing a voice. The algorithm used to recognize the voice may be at least one of, for example, a hidden Markov model (HMM) algorithm, an artificial neural network (ANN) algorithm, or a dynamic time warping (DTW) algorithm.

According to an embodiment, the intelligence agent 1151 may convert a voice input of the user into text data. According to an embodiment, the intelligence agent 1151 may transmit a voice of the user to the intelligence server 1200 and may receive converted text data. Thus, the intelligence agent 1151 may display the text data on the display 1120.

According to an embodiment, the intelligence agent 1151 may receive a path rule transmitted from the intelligence server 1200. According to an embodiment, the intelligence agent 1151 may transmit the path rule to the execution manager module 1153.

According to an embodiment, the intelligence agent 1151 may transmit an execution result log according to the path rule received from the intelligence server 1200 to an intelligence service module 1155. The transmitted execution result log may be accumulated and managed in preference information of the user of a persona module (or a persona manager) 1155b.

The execution manager module 1153 according to an embodiment may receive a path rule from the intelligence agent 1151 and may execute the apps 1141 and 1143 such that the apps 1141 and 1143 respectively execute the actions 1141a and 1143b included in the path rule. For example, the execution manager module 1153 may transmit command information for executing the actions 1141b and 1143b to the apps 1141 and 1143 and may receive completion information of the actions 1141b and 1143b from the apps 1141 and 1143.

According to an embodiment, the execution manager module 1153 may transmit and receive command information for executing the actions 1141b and 1143b of the apps 1141 and 1143 between the intelligence agent 1151 and the apps 1141 and 1143. The execution manager module 1153 may bind the apps 1141 and 1143 to be executed according to the path rule and may transmit command information of the actions 1141b and 1143b included in the path rule to the apps 1141 and 1143. For example, the execution manager module 1153 may sequentially transmit the actions 1141b and 1143b included in the path rule to the apps 1141 and 1143 and may sequentially execute the actions 1141b and 1143b of the apps 1141 and 1143 depending on the path rule.

According to an embodiment, the execution manager module 1153 may manage a state where the actions 1141b and 1143b of the apps 1141 and 1143 are executed. For example, the execution manager module 1153 may receive information about a state where the actions 1141b and 1143b are executed from the apps 1141 and 1143. When the state where the actions 1141b and 1143b are executed is, for example, a partial landing state (e.g., when a parameter necessary for the actions 1141b and 1143b is not input), the execution manager module 1153 may transmit information about the partial landing state to the intelligence agent 1151. The intelligence agent 1151 may request to input information (e.g., parameter information) necessary for the user using the received information. When the state where the actions 1141b and 1143b are executed is, for another example, an action state, the execution manager module 1153 may receive speech from the user and may transmit information about the executed apps 1141 and 1143 and information about a state where the apps 1141 and 1143 are executed to the intelligence agent 1151. The intelligence agent 1151 may receive parameter information of speech of the user through the intelligence server 1200 and may transmit the received parameter information to the execution manager module 1153. The execution manager module 1153 may change a parameter of the actions 1141b and 1143b to a new parameter using the received parameter information.

According to an embodiment, the execution manager module 1153 may transmit parameter information included in the path rule to the apps 1141 and 1143. When the plurality of apps 1141 and 1143 are sequentially executed according to the path rule, the execution manager module 1153 may transmit the parameter information included in the path rule from one app to another app.

According to an embodiment, the execution manager module 1153 may receive a plurality of path rules. The execution manager module 1153 may select the plurality of path rules based on speech of the user. For example, when speech of the user specifies one app (e.g., the first app 1141) to execute some actions (e.g., the action 1141b), but when it does not specify another app (e.g., the second app 1143) to execute the other actions (e.g., the action 1143b), the execution manager module 1153 may receive a plurality of different path rules in which the same app 1141 (e.g., a gallery app) to execute the some actions (e.g., the action 1141b) is executed and in which the different apps 1143 (e.g., a message app and a telegram app) capable of executing the other operations (e.g., the action 1143b) are executed. The execution manager module 1153 may execute, for example, the same actions 1141b and 1143b (e.g., the consecutive same actions 1141b and 1143b) of the plurality of path rules. When the same actions are executed, the execution manager module 1153 may display a state screen capable of the different apps 1141 and 1143 included in the plurality of path rules on the display 1120.

According to an embodiment, the intelligence service module 1155 may include a context module 1155a, a persona module 1155b, or an offer module 1155c.

The context module 1155a may collect a current state of each of the apps 1141 and 1143 from the apps 1141 and 1143. For example, the context module 1155a may receive context information indicating the current state of each of the apps 1141 and 1143 and may collect the current state of each of the apps 1141 and 1143.

The persona module 1155b may manage personal information of the user who uses the user terminal 1100. For example, the persona module 1155b may collect information about the use of the user terminal 1100 and the result of performing the user terminal 1100 and may manage the personal information of the user.

The offer module 1155c may predict an intent of the user and may recommend a command to the user. For example, the offer module 1155c may recommend the command to the user in consideration of a current state (e.g., time, a place, a situation, or an app) of the user.

Figure 12:
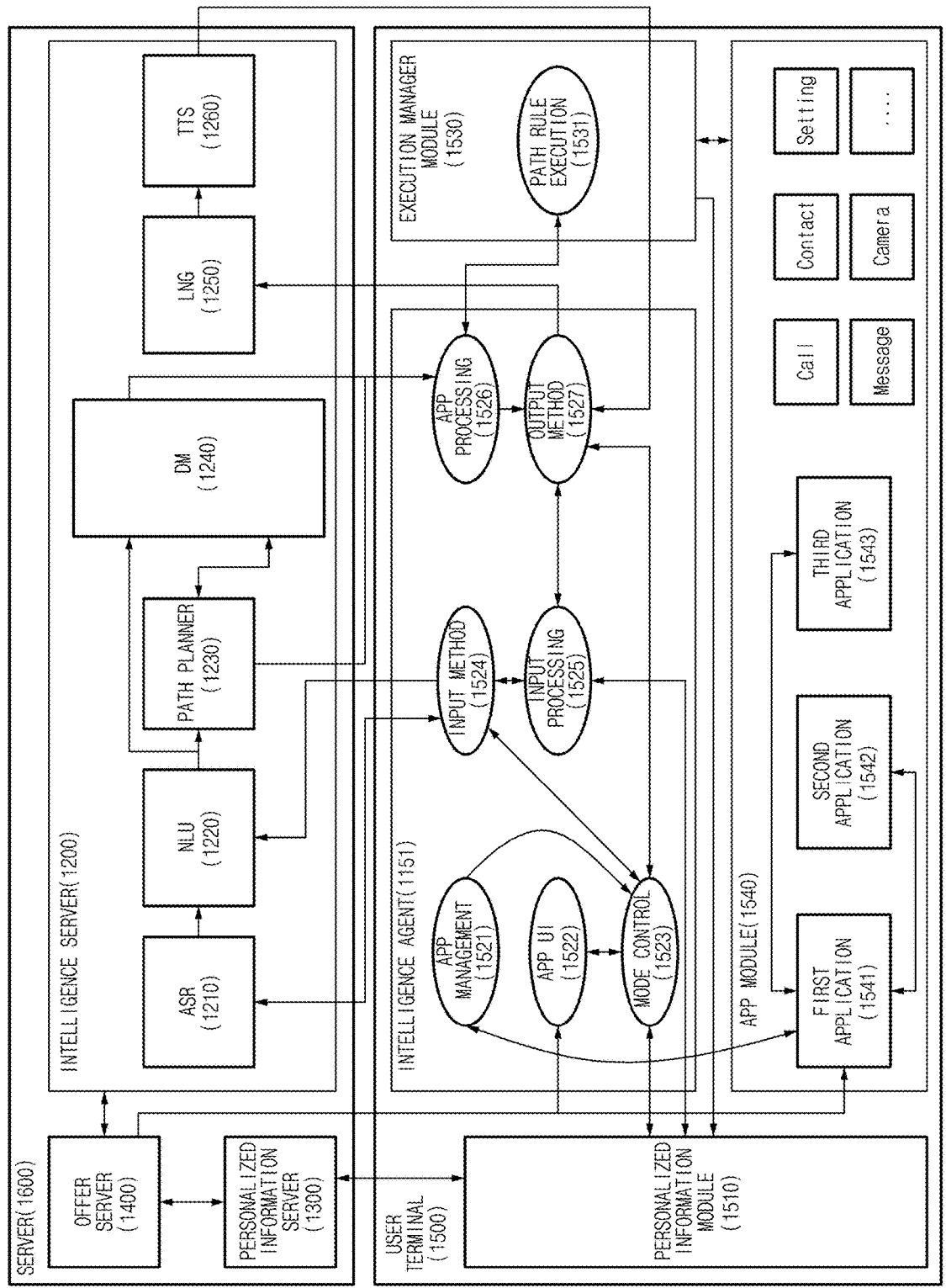
FIG. 12 is a block diagram of a user terminal and a server according to an embodiment of the present disclosure.

FIG. 12 illustrates a block diagram of a user terminal and a server according to an embodiment of the present disclosure. Elements having the same reference numerals as an integrated intelligence system 1000 and a user terminal 1100 shown in FIGS. 10 and 11 may be applied to be the same as contents described with reference to FIGS. 10 and 11.

Referring to FIG. 12, a user terminal 1500 may include a personalized information module 1510, an intelligence agent 1151, an execution manager module 1530, and an app module 1540.

According to an embodiment, the personalized information module 1510 may collect and store a variety of data. For example, the personalized information module 1510 may collect and analyze a habit of a user and may store data associated with the habit of the user. In other words, the personalized information module 1510 may collect and store a habit where the user uses an application, a uniform resource locator (URL) of a used web browser, a search keyword, or the like. The stored data may be transmitted to the intelligence agent 1151.

The intelligence agent 1151 may include an app management process 1521, an app user interface (UI) process 1522, a mode control process 1523, an input method process 1524, an input processing process 1525, an app processing process 1526, and an output method process 1527. The intelligence agent 1151 may be a single element included in the user terminal 1500, but, for convenience of description, as described above, it is assumed that the intelligence agent 1151 operates through the plurality of processes.

The app management process 1521 may execute a first application 1541 (e.g., an intelligence content curation application (e.g., hello BIXBY), s-health, s-voice, or the like) or a second application 1542 (e.g., an intelligence image processing application (e.g., BIXBY VISION) or an intelligence application (e.g., BIXBY)) when the user pushes a hardware key (e.g., short press, long press, press & hold, double press, or the like) or in a method such as speech triggering, touch, swipe, or the like. In this case, the app management process 1521 may execute the application using an input value input through the input method process 1524. For example, in case of an operation of performing a short press of the hardware key or swiping to the right, the app management process 1521 may execute the first application 1541. In case of an operation of pressing & holding the hardware key, the app management process 1521 may execute the second application 1542. According to an embodiment, the app management process 1521 may update the application through communication with a server 1600 to verify whether the first application 1541 or the second application 1542 has the latest version.

The app UI process 1522 may control a UI. As an embodiment, the app UI process 1522 may convert a mode based on a user input. For example, the app UI process 1522 may switch from a command mode to a dictation mode. The app UI process 1522 may display a hint, a command history, or the like and may provide a user guide through a UI.

The mode control process 1523 may control an operation of the app module 1540. For example, when the user is unable to see a display, the mode control process 1523 may control the app module 1540 to operate in an eyes-free mode. For another embodiment, when the user speaks near a receiver, the mode control process 1523 may change an audio path to the receiver.

The input method process 1524 may provide methods for the user to execute the first application 1541 or the second application 1542. For example, the input method process 1524 may provide a method of voice wake-up, voice wake-up together with a command, pressing & holding the BIXBY key.

When the first application 1541 or the second application 1542 is executed, the user may transmit a command through a voice input, a text input (typing text), a predictive command, or a touch input.

The input processing process 1525 may process various inputs through the input method process 1524 and may perform a corresponding operation. For example, when there is voice wake-up or embedded automatic speech recognition (ASR), the input processing process 1525 may convert an input user voice into a text.

The app processing process 1526 may determine whether the user terminal 1500 performs any operation based on a result value received from the server 1600. For example, when receiving a path rule from the server 1600, the app processing process 1526 may transmit the received path rule to the execution manager module 1530. The app processing process 1526 may generate a touch event before a path rule is received and may operate an application.

According to an embodiment, when it is necessary to call an application based on a result value received from the server 1600, the app processing process 1526 may call an application programmable interface (API) or the like using an intent, a parameter, or the like. In this case, when it is impossible to call the application, the app processing process 1526 may transmit an error value to the server 1600. Further, the app processing process 1526 may transmit a parameter incorrect while an operation is performed, an error value, or the like to the server 1600.

The output method process 1527 may output the result value processed by the app processing process 1526 or the input processing process 1525. For example, the output method process 1527 may output the result value through at least one of a voice output, a text output, and a graphical output. The execution manager module 1530 may include a path rule execution module 1531. The execution manager module 1530 (or the path rule execution module 1531) may execute a related application based on a path rule transmitted after an app is processed. The execution manager module 1530 may transmit state information defined in the path rule to perform an operation of a corresponding application depending on a received path rule. The execution manager module 1530 may manage whether an application operates suitably depending on a path rule. For example, the execution manager module 1530 may play a role in requesting a natural language generator (NLG), transmitting app context logging information to a personalized information module 1510, and collecting information about a version of an application and transmitting the collected information to the server 1600.

The app module 1540 may update a card through the second application 1542 and a third application 1543 (e.g., a reminder application). The third application 1543 may be an application which registers a schedule and a schedule of the user. For example, the app module 1540 may execute the second application 1542 (e.g., BIXBY) to receive a user input and may register corresponding contents in the third application 1543. The third application 1543 may register the contents in the first application 1541 in the form of a card.

The server 1600 may include an offer server 1400, a personalized information server 1300, and an intelligence server 1200.

The offer server 1400 may generate a hint. According to an embodiment, the offer server 1400 may generate a hint capable of being recommended in consideration of frequency of use depending on a current state. For example, the offer server 1400 may generate the hint in consideration of a usage pattern of the user.

According to an embodiment, the offer server 1400 may generate a hint of introducing a new function or a function frequently used by another user to the user. For example, introduction (e.g., an operation method) for the intelligence agent 1151 may be included in the hint of introducing the new function.

The personalized information server 1300 may receive data stored in the personalized information module 1510 from the personalized information module 1510. The personalized information server 1300 may transmit the data to the offer server 1400. The data transmitted to the offer server 1400 may be used for the offer server 1400 to generate a hint.

The intelligence server 1200 may include an ASR module 1210, a natural language understanding (NLU) module 1220, a path planner module 1230, a dialogue manager (DM) module 1240, a natural language generator (NLG) module 1250, or a text to speech (TTS) module 1260.

The NLU module 1220 or the path planner module 1230 of the intelligence server 1200 may generate a path rule.

According to an embodiment, the ASR module 1210 may convert a user input received from the user terminal 1500 into text data.

According to an embodiment, the ASR module 1210 may convert a user input received from the user terminal 1500 into text data. For example, the ASR module 1210 may include a speech recognition module. The speech recognition module may include an acoustic module and a language module. For example, the acoustic module may include information associated with speech, and the language module may include unit phoneme information and information about a combination of the unit phoneme information. The speech recognition module may convert speed of the user into text data using information associated with vocalization and unit phoneme information. Information about the acoustic mode and the language model may be stored in, for example, an ASR database (DB).

According to an embodiment, the NLU module 1220 may perform a syntactic analysis or a sematic analysis and may determine an intent of the user. The syntactic analysis may be to divide a user input into a syntactic unit (e.g., a word, a phrase, a morpheme, or the like) and determine whether the divided unit has any syntactic element. The semantic analysis may be performed using sematic matching, rule matching, formula matching, or the like. Thus, the NLU module 1220 may obtain a domain, an intent, or a parameter (or a slot) necessary to represent the intent.

According to an embodiment, the NLU module 1220 may determine an intent of the user and a parameter using a matching rule divided into a domain, an intent, and a parameter (or a slot) necessary to determine the intent. For example, the one domain (or an alarm) may include a plurality of intents (e.g., an alarm setting, alarm release, or the like). One intent may include a plurality of parameters (e.g., time, the number of times of repetition, an alarm sound, or the like). A plurality of rules may include, for example, one or more essential element parameters. The matching rule may be stored in an NLU DB.

According to an embodiment, the NLU module 1220 may determine the meaning of a word extracted from a user input using a linguistic feature (e.g., a syntactic element) of a morpheme, a phrase, or the like and may match the meaning of the determined word to a domain and intent, thus determining an intent of the user. For example, the NLU module 1220 may calculate how many words extracted from a user input are included in each domain and intent and may determine an intent of the user. According to an embodiment, the NLU module 1220 may determine a parameter of a user input using a word based on determining the intent.

According to an embodiment, the NLU module 1220 may determine an intent of the user using the NLU DB which stores a linguistic feature for determining an intent of a user input. According to another embodiment, the NLU module 1220 may determine an intent of the user using a personal language model (PLM). For example, the NLU module 1220 may determine an intent of the user using personalized information (e.g., a contact list, a music list, or the like). The PLM may be stored in, for example, the NLU DB. According to an embodiment, the ASR module 1210 as well as the NLU module 1220 may recognize a voice of the user with reference to a PLM stored in the NLU DB.

According to an embodiment, the NLU module 1220 may generate a path rule based on an intent of a user input and a parameter. For example, the NLU module 1220 may select an app to be executed based on the intent of the user input and may determine an action to be performed in the selected app. The NLU module 1220 may determine a parameter corresponding to the determined action to generate a path rule. According to an embodiment, the path rule generated by the NLU module 1220 may include information about an app to be executed, an action to be executed in the app, and a parameter necessary to execute the action.

According to an embodiment, the NLU module 1220 may generate one path rule or a plurality of path rules based on an intent of a user input and a parameter. For example, the NLU module 1220 may determine a path rule by receiving a path rule set corresponding to the user terminal 1500 from the path planner module 1230 and matching an intent of a user input and a parameter to the received path rule set.

According to another embodiment, the NLU module 1220 may determine an app to be executed, an action to be executed in the app, and a parameter necessary to execute the action based on an intent of a user input and a parameter and may generate one path rule and a plurality of path rule. For example, the NLU module 1220 may arrange the app to be executed and the action to be executed in the app in the form of ontology or a graphic model depending on an intent of a user input using information of the user terminal 1500. The generated path rule may be stored in, for example, a path rule (PR) DB through the path planner module 1230. The generated path rule may be added to a path rule set of the PR DB.

According to an embodiment, the NLU module 1220 may select at least one of the plurality of generated path rules. For example, the NLU module 1220 may select an optimum path rule among the plurality of path rules. For another example, when only some actions are specified based on speech of the user, the NLU module 1220 may select a plurality of path rules. The NLU module 1220 may determine one of the plurality of path rules by an additional input of the user.

According to an embodiment, the NLU module 1220 may transmit a path rule to the user terminal 1500 depending to a request for a user input. For example, the NLU module 1220 may transmit one path rule corresponding to a user input to the user terminal 1500. For another example, the NLU module 1220 may transmit a plurality of path rules corresponding to a user input to the user terminal 1500. For example, when only some actions are specified based on speech of the user, the plurality of path rules may be generated by the NLU module 1220.

According to an embodiment, the path planner module 1230 may select at least one of the plurality of path rules.

According to an embodiment, the path planner module 1230 may transmit a path rule set including the plurality of path rules to the NLU module 1220. The plurality of path rules of the path rule set may be stored in the PR DB connected to the path planner module 1230 in the form of a table. For example, the path planner module 1230 may transmit a path rule set corresponding to information (e.g., operating system (OS) information or app information) of the user terminal 1500, received from the intelligence agent 1151, to the NLU module 1220. A table stored in the PR DB may be stored for, for example, each domain or each version of a domain.

According to an embodiment, the path planner module 1230 may select one path rule or a plurality of path rules from a path rule set and may transmit the selected one path rule or the plurality of selected path rules to the NLU module 1220. For example, the path planner module 1230 may match an intent of the user and a parameter to a path rule set corresponding to the user terminal 1500 and may select one path rule or a plurality of path rules, thus transmitting the one path rule or the plurality of selected path rules to the NLU module 1220.

According to an embodiment, the path planner module 1230 may generate one path rule or a plurality of path rules using an intent of the user and a parameter. For example, the path planner module 1230 may determine an app to be executed and an action to be executed in the app based on the intent of the user and the parameter and may generate the one path rule or the plurality of path rules. According to an embodiment, the path planner module 1230 may store the generated path rule in the PR DB.

According to an embodiment, the path planner module 1230 may store the path rule generated by the NLU module 1220 in the PR DB. The generated path rule may be added to a path rule set stored in the PR DB.

According to an embodiment, a plurality of path rules or a plurality of path rule sets may be included in a table stored in the PR DB. The plurality of path rules or the plurality of path rule sets may reflect a type, a version, a type, or a characteristic of a device which performs each path rule.

According to an embodiment, the DM module 1240 may determine whether the intent of the user, determined by the NLU module 1220, is clear. For example, the DM module 1240 may determine whether the intent of the user is clear based on whether information of a parameter is sufficient. The DM module 1240 may determine whether a parameter determined by the NLU module 1220 is sufficient to perform a task. According to an embodiment, when the intent of the user is not clear, the DM module 1240 may perform feedback of requesting information necessary for the user. For example, the DM module 1240 may perform feedback of requesting information about a parameter for determining an intent of the user.

According to an embodiment, the DM module 1240 may include a content provider module. When the content provider module is able to perform an action based on the intent and the parameter determined by the NLU module 1220, it may generate a result of performing a task corresponding to a user input. According to an embodiment, the DM module 1240 may transmit the result generated by the content provider module as a response to a user input to the user terminal 1500.

According to an embodiment, the LNG module 1250 may change specified information to a text format. The information changed to the text format may have a form of natural language speech. The specified information may be, for example, information about an additional input, information of providing a notification that an action corresponding to a user input is completed, or information of providing a notification of an additional input of the user (e.g., information about feedback on a user input). The information changed to the text format may be transmitted to the user terminal 1500 to be displayed on a display 1120 of FIG. 11, or may be transmitted to the TTS module 1260 to be changed to a voice format.

According to an embodiment, the TTS module 1260 may change information of a text format to information of a voice format. The TTS module 1260 may receive information of a text format from the LNG module 1250 and may change the information of the text format to information of a voice format, thus transmitting the information of the voice format to the user terminal 1500. The user terminal 1500 may output information of the voice format to a speaker 1130 of FIG. 11.

According to an embodiment, the NLU module 1220, the path planner module 1230, and the DM module 1240 may be implemented as one module. For example, the NLU module 1220, the path planner module 1230, and the DM module 1240 may be implemented as one module to determine an intent of the user and a parameter and generate a response (e.g., a path rule) corresponding to the determined intent of the user and the determined parameter. Thus, the generated response may be transmitted to the user terminal 1500.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
 a housing;
 a touch screen display located in the housing, and exposed through a first region of the housing, wherein the touch screen display includes a first edge and a second edge that is parallel to the first edge;
 a microphone located in the housing and exposed through a second region of the housing;
 at least one speaker located in the housing and exposed through a third region of the housing;
 a wireless communication circuit located in the housing;
 a memory located in the housing; and
 a processor located in the housing and operably connected with the touch screen display, the microphone, the at least one speaker, the wireless communication circuit, and the memory, wherein the processor is configured to:
  output a home screen including a plurality of application icons in a matrix pattern,
  receive a gesture input in a first direction, and
  output a user interface, based on the gesture input in the first direction on the touch screen display outputting the home screen, the user interface includes a button that allows a user to call a first operation and a plurality of cards,
 wherein, to call the first operation, the processor is configured to:
  receive a user input through at least one of the touch screen display or the microphone,
  transmit, via the wireless communication circuit, data associated with the user input to an external server,
  receive a response via the wireless communication circuit from the external server, and
  perform a task that allows the electronic device to include a series of states,
 wherein the user input comprises a request to perform the task using at least one of a number of application programs,
 wherein the response comprises information about the series of states for the electronic device to perform the task,
 wherein at least one of the cards includes content providing related information based on the task, and
 wherein the at least one of the cards is updated by a second operation that causes the processor to:
  receive a first notification generated from the at least one application program installed in the electronic device or receive a second notification from the external server to update the cards,
  determine a position of a graphic indication based on the first direction,
  output the graphic indication at the determined position on the touch screen display when at least one of the first notification and the second notification is received, and
  output the at least one of the cards including updated content based on a user input to the graphic indication.

2. The electronic device of claim 1, wherein the touch screen display comprises a third edge and a fourth edge that are perpendicular to the first edge and the second edge and include a shorter length than the first edge and the second edge.

3. The electronic device of claim 2, wherein the graphic indication comprises a bar shape overlapped with the home screen.

4. The electronic device of claim 3, wherein the processor is configured to fail to output the graphic indication on another screen except for the home screen.

5. The electronic device of claim 1, wherein the processor is configured to output the user interface when receiving the gesture input.

6. The electronic device of claim 1, wherein the processor is configured to output the graphic indication before receiving the gesture input.

7. The electronic device of claim 1, further comprising:
 a sensor located in the housing and operably connected with the processor,
 wherein the processor is configured to update the cards based on data measured by the sensor.

8. The electronic device of claim 1, wherein the processor is configured to update the cards based on data stored in the memory.

9. The electronic device of claim 1, wherein the processor is configured to update the cards for each predetermined period.

10. The electronic device of claim 1, wherein the processor is configured to update the cards based on the user input.

11. The electronic device of claim 1, further comprising:
 a motor located in the housing and operably connected with the processor,
 wherein the processor is configured to allow the motor to vibrate when at least one of the first notification and the second notification is received.

12. The electronic device of claim 1, further comprising:
 a light-emitting device exposed through a fourth region of the housing,
 wherein the processor is configured to allow the light-emitting device to emit light when at least one of the first notification and the second notification is received.

13. The electronic device of claim 1, wherein the processor is configured to set cards associated with the graphic indication based on the user input.

14. The electronic device of claim 1, wherein the processor is configured to output the updated cards on the touch screen display in a specified order.

15. An electronic device, comprising:
 a housing;
 a touch screen display located in the housing, and exposed through a first region of the housing, wherein the touch screen display includes a first edge and a second edge that is parallel to the first edge;
a microphone located in the housing and exposed through a second region of the housing;
at least one speaker located in the housing and exposed through a third region of the housing;
a wireless communication circuit located in the housing;
a memory located in the housing; and
a processor located in the housing and be operably connected with the touch screen display, the microphone, the at least one speaker, the wireless communication circuit, and the memory, wherein the processor is configured to:
  output one of a plurality of pages including a home screen and a page including cards on the touch screen display, the page including the cards is output based on a gesture input in a first direction on the home screen,
  update the cards based on at least one of first data stored in the memory and second data received from an external device,
  determine whether a page output on the touch screen display corresponds to the home screen,
  determine a position of a graphic indication based on the first direction,
  output the graphic indication at the determined position on the home screen based on whether the page output on the touch screen display corresponds to the home screen, and
  output the updated cards including updated content based on a user input to the graphic indication.

16. The electronic device of claim 15, wherein the processor is configured to output a user interface on one of the plurality of pages.

17. The electronic device of claim 16, wherein the user interface comprises a button for receiving a user input through the microphone and the cards.

18. The electronic device of claim 15, wherein the processor is configured to update the cards based on a user input.

19. The electronic device of claim 15, wherein the processor is configured to change the output page based on a first gesture input from the first edge to the second edge or a second gesture input from the second edge to the first edge.

20. An electronic device, comprising:
a housing;
a touch screen display located in the housing, and exposed through a first region of the housing, wherein the touch screen display includes a first edge and a second edge that is parallel to the first edge;
a microphone located in the housing and exposed through a second region of the housing;
at least one speaker located in the housing and exposed through a third region of the housing;
a wireless communication circuit located in the housing;
a memory located in the housing; and
a processor located in the housing and be operably connected with the touch screen display, the microphone, the at least one speaker, the wireless communication circuit and the memory, wherein the processor is configured to:
  output a home screen including a plurality of application icons in a matrix pattern,
  receive a gesture input in a first direction, and
  output a user interface including at least one card, based on the gesture input in the first direction on the touch screen display outputting the home screen,
  update the at least one card, wherein to update the at least one card, the processor is further configured to:
    receive a user input through at least one of the touch screen display or the microphone,
    transmit data via the wireless communication circuit associated with the user input to an external server via the wireless communication circuit,
    receive a response via the wireless communication circuit from the external server, and
    perform a task by allowing the electronic device to include a series of states,
  receive a first notification generated from an application program installed in the electronic device, and
  receive a second notification from the external server to update the at least one card,
wherein the user input comprises a request for performing the task using at least one of a number of application programs,
wherein the response comprises information about the series of states for the electronic device to perform the task,
wherein the at least one card includes content providing related information based on the task, and
wherein the processor is further configured to:
  determine a position of a graphic indication based on the first direction,
  output the graphic indication at the determined position on the touch screen display when at least one of the first notification and the second notification is received, and
  output the at least one card including updated content based on a user input to the graphic indication.

* * * * *